US012694788B1

(12) United States Patent
Reed et al.

(10) Patent No.: US 12,694,788 B1
(45) **Date of Patent: *Jul. 28, 2026**

(54) TRAFFIC SIGNAL SYSTEM FOR CONGESTED TRAFFICWAYS

(71) Applicants: Amanda Reed, Strafford, MO (US); Daniel E. Reed, Strafford, MO (US)

(72) Inventors: Amanda Reed, Strafford, MO (US); Daniel E. Reed, Strafford, MO (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/388,014

(22) Filed: Nov. 8, 2023

Related U.S. Application Data

(63) Continuation of application No. 18/226,898, filed on Jul. 27, 2023, now abandoned, which is a (Continued)

(51) Int. Cl.

| | |
|---|---|
| ***G08G 1/01*** | (2006.01) |
| ***G08G 1/005*** | (2006.01) |
| ***G08G 1/07*** | (2006.01) |
| ***G08G 1/095*** | (2006.01) |
| ***G08G 1/16*** | (2006.01) |

(52) U.S. Cl.
CPC ............. *G08G 1/166* (2013.01); *G08G 1/005* (2013.01); *G08G 1/01* (2013.01); *G08G 1/07* (2013.01); *G08G 1/095* (2013.01)

(58) Field of Classification Search
CPC ........... G08G 1/005; G08G 1/01; G08G 1/07; G08G 1/095; G08G 1/166; G08G 1/00; G08G 3/00; G08G 5/00; G08G 7/00; G08G 9/00; G08G 99/00; G08G 1/0116; G08G 1/0145; G08G 1/04; G08G 1/052; G08G 1/096775; G08G 1/164; B66C 13/46; B66C 15/045; B66C 15/065; B66C 1/00; B66C 3/00; B66C 5/00; B66C 6/00; B66C 7/00; B66C 9/00; B66C 11/00; B66C 13/00; B66C 15/00; B66C 17/00; B66C 19/00; B66C 21/00; B66C 23/00; B66C 25/00; B66C 2700/00; B66F 17/003; B66F 9/0755; B66F 1/00; B66F 3/00; B66F 5/00; B66F 7/00; B66F 9/00; B66F 11/00;
(Continued)

(56) References Cited

U.S. PATENT DOCUMENTS

| | | | |
|---|---|---|---|
| 4,115,757 A | 9/1978 | Blahunka | 340/32 |
| 4,247,922 A | 1/1981 | Jackson et al. | 367/6 |

(Continued)

FOREIGN PATENT DOCUMENTS

| | | |
|---|---|---|
| CN | 102637372 | 8/2012 |

*Primary Examiner* — Daniel Previl
(74) *Attorney, Agent, or Firm* — Benjamin D. Rotman; UB Greensfelder LLP

(57) ABSTRACT

A traffic signal system for congested trafficways has a plurality of stationary alarm light/sensor-reader combinations and mobile alarm light/sensor-reader combinations monitoring each other and monitory tags placed on individuals, machines, and hazards to provide real time alarms to not only pedestrians but also machine operators, who are potentially approaching harm's way, or have the better ability to avert potential harm. Different forms of alarms are provided to indicate different kinds of alarm conditions and to reduce complacency to alarms, and thus improve effectiveness.

20 Claims, 19 Drawing Sheets

Related U.S. Application Data continuation of application No. 17/367,851, filed on Jul. 6, 2021, now Pat. No. 11,756,427, which is a continuation-in-part of application No. 16/748,000, filed on Jan. 21, 2020, now Pat. No. 11,056,004, which is a continuation of application No. 16/223,695, filed on Dec. 18, 2018, now Pat. No. 10,559,207, which is a continuation of application No. 15/223,330, filed on Jul. 29, 2016, now Pat. No. 10,192,441, which is a continuation of application No. 14/687,322, filed on Apr. 15, 2015, now Pat. No. 9,424,749.

(60) Provisional application No. 63/132,620, filed on Dec. 31, 2020, provisional application No. 62/139,487, filed on Mar. 27, 2015, provisional application No. 61/979,732, filed on Apr. 15, 2014.

(58) Field of Classification Search
CPC .......... B66F 13/00; B66F 15/00; B66F 17/00; B66F 19/00; B66F 2700/00
USPC ......... 340/903, 906, 902, 551, 573.1, 425.5, 340/539.1, 691.3, 545.1, 686.1, 686.6, 340/687
See application file for complete search history.

(56) References Cited

U.S. PATENT DOCUMENTS

| | | | | |
|---|---|---|---|---|
| 4,849,735 | A | 7/1989 | Kirtley et al. | 340/539 |
| 4,907,160 | A | 3/1990 | Duncan | G08G 1/081 |
| 5,315,289 | A | 5/1994 | Fuller et al. | 340/532 |
| 5,319,352 | A | 6/1994 | Robertson et al. | 340/466 |
| 5,572,202 | A | 11/1996 | Regal et al. | 340/917 |
| 5,959,552 | A | 9/1999 | Cho | G01S 13/931 |
| 6,208,260 | B1 | 3/2001 | West et al. | 340/691.3 |
| 6,329,931 | B1 | 12/2001 | Gunton | 340/933 |
| 6,650,242 | B2 | 11/2003 | Clerk et al. | 340/573.1 |
| 6,784,800 | B2 | 8/2004 | Orzechowski | 340/679 |
| 6,812,849 | B1 | 11/2004 | Ancel | 340/500 |
| 6,963,278 | B2 | 11/2005 | Frame | 340/539.22 |
| 7,119,673 | B2 | 10/2006 | Eager et al. | 340/500 |
| 7,307,595 | B2 | 12/2007 | Schantz et al. | 343/718 |
| 7,397,390 | B2 | 7/2008 | DiPiazza | 340/905 |
| 7,408,479 | B2 | 8/2008 | Johnson | 340/917 |
| 7,482,948 | B1 | 1/2009 | Northway et al. | 340/925 |
| 7,688,223 | B2 | 3/2010 | Magens et al. | 340/905 |
| 7,944,368 | B2 | 5/2011 | Carter et al. | 340/686.6 |
| 8,102,269 | B2 | 1/2012 | Boehm et al. | 340/573.4 |
| 8,144,000 | B2 | 3/2012 | Darby, Jr. et al. | 340/435 |
| 8,314,686 | B2 | 11/2012 | Kirtly et al. | 340/10.1 |
| 8,547,234 | B2 | 10/2013 | Maly et al. | 340/573.1 |
| 8,630,758 | B2 | 1/2014 | Ehrler et al. | 701/19 |
| 8,648,709 | B2 | 2/2014 | Gauger et al. | 340/539.1 |
| 8,674,845 | B2 | 3/2014 | Carter et al. | 340/686.6 |
| 8,715,576 | B2 | 5/2014 | Bangera | G08B 21/245 |
| 8,896,685 | B2 | 11/2014 | Ihara | G06G 1/04 |
| 8,905,568 | B2 | 12/2014 | Fossier et al. | 362/135 |
| 9,424,749 | B1 * | 8/2016 | Reed | G08G 1/166 |
| 10,192,441 | B1 * | 1/2019 | Reed | G08G 1/166 |
| 10,559,207 | B1 * | 2/2020 | Reed | G08G 1/166 |
| 11,056,004 | B1 * | 7/2021 | Reed | G08G 1/01 |
| 11,756,427 | B1 * | 9/2023 | Reed | B66F 17/003 340/903 |
| 2003/0016143 | A1 | 1/2003 | Ghazarian | 340/901 |
| 2003/0218848 | A1 * | 11/2003 | Klippel | H02J 3/007 361/100 |
| 2005/0045710 | A1 | 3/2005 | Burke | 235/375 |
| 2005/0086000 | A1 | 4/2005 | Tsuchiya | G08G 1/166 |
| 2007/0024433 | A1 | 2/2007 | Garner | 340/436 |
| 2008/0118104 | A1 | 5/2008 | Ariyur | F41G 3/02 |
| 2009/0150009 | A1 | 6/2009 | Villaume | G08G 5/065 |
| 2009/0231583 | A1 | 9/2009 | Smith | G01J 4/04 |
| 2009/0240695 | A1 | 9/2009 | Angell | G06Q 10/10 |
| 2009/0262189 | A1 | 10/2009 | Marman | G08B 13/19613 |
| 2010/0052973 | A1 * | 3/2010 | Fabre | G08G 5/51 342/30 |
| 2010/0289662 | A1 | 11/2010 | Dasilva | F16P 3/147 |
| 2013/0275187 | A1 | 10/2013 | Patel | Y04S 10/54 |
| 2014/0168415 | A1 | 6/2014 | Ihlenburg | B60R 11/04 |
| 2014/0219506 | A1 | 8/2014 | Foltin | B60Q 1/143 |
| 2014/0230755 | A1 | 8/2014 | Trenkle | A01K 27/009 |
| 2014/0336923 | A1 * | 11/2014 | Hwang | G01C 21/3461 701/410 |
| 2015/0009046 | A1 | 1/2015 | Senfleben et al. | G09F 21/04 |
| 2015/0119086 | A1 | 4/2015 | Mirowski | G01C 21/206 |
| 2015/0142533 | A1 | 5/2015 | Shalev | G06Q 50/30 |
| 2015/0142535 | A1 | 5/2015 | Payne | G06Q 30/0241 |

* cited by examiner

TRAFFIC SIGNAL SYSTEM FOR CONGESTED TRAFFICWAYS

CROSS-REFERENCE TO RELATED APPLICATION(S)

This application is a continuation-in-part of U.S. patent application Ser. No. 16/748,000, filed Jan. 21, 2020, now U.S. Pat. No. 11,056,004; which is a continuation of U.S. patent application Ser. No. 16/223,695, filed Dec. 18, 2018, now U.S. Pat. No. 10,559,207; which is a continuation of U.S. patent application Ser. No. 15/223,330, filed Jul. 29, 2016, now U.S. Pat. No. 10,192,441; which is a continuation of U.S. patent application Ser. No. 14/687,322, filed Apr. 15, 2015, now U.S. Pat. No. 9,424,749; which claims the benefit of U.S. Provisional Application No. 61/979,732, filed Apr. 15, 2014, and U.S. Provisional Application No. 62/139,487, filed Mar. 27, 2015.

This application claims the benefit of U.S. Provisional Application No. 63/132,620, filed Dec. 31, 2020.

The foregoing patent disclosures are incorporated herein by this reference thereto.

BACKGROUND AND SUMMARY OF THE INVENTION

The invention relates to signal systems for motor vehicle and/or pedestrian traffic and, more particularly, to such a traffic signal system for service in commercial and/or institutional warehouses, factory floors, and so on, in which there is both interior workspaces, exterior workspaces, and/or high (eg., above ground) workspaces. The concept of workspaces might be more narrowly conceived as 'hazard areas' in particular.

Nowadays, commercial warehouses (for example and without limitation) are commonly plagued with a problem known as 'blind" intersections, and sometimes also 'blind' corners. The root of this problem lies in the arrangement of the warehouse shelving. That is, the warehouse shelving is typically arranged in large high-rise rectangular blocks. These blocks are typically spaced by narrow aisles through which pedestrian and/or fork lift trucks travel to and fro. There is an acute problem with intersections (and corners). The large high-rise rectangular blocks of shelving are sometimes so densely packed with boxes of product (or the like) that, there is no way for a pedestrian or fork lift driver to see if there is any cross-flow traffic from the left or the right of the intersection until such pedestrian or fork lift driver actually enters the intersection. Hence these are 'blind' intersections, and the potential for collision is ripe. A counterpart collision hazard is a 'blind' corner.

Another factor contributing to the confusion in these traffic lanes is the sheer noise in the warehouse. A cautious fork-lift driver might try to signal his or her approach to an intersection by horn or other audible siren. However, in large commercial warehouse with dozens upon dozens of fork lifts (and other motor vehicle traffic) whizzing about, the atmosphere is deafened by the sounds of dozens of such sirens beeping at once. Workers in the warehouse tend to develop a complacency to the sirens. Also, the sound tends to echo and/or reverberate around in the warehouse such that, the source of any such beeping siren is simply indiscernible. So there is no good way to determine how near or far is the source of the siren. Accordingly, the cautious fork-lift driver who thought he or she was being cautious by signaling his or her approach to blind intersection with a siren, might as not even have bothered, as a practical matter.

It is an object of the invention to overcome the shortcomings of the prior art.

It is another object of the invention to provide a workspace with stationary alarm lights on hazards like corners of blind intersections or dangerous machines that are triggered to flash warning signals or the like whenever a tagged pedestrian or motor vehicle enters within a pre-defined perimeter.

A single light might be combined with a dedicated sensor and mounted fixed to protect, for example, a single intersection. The sensor can detect multiple objects within a perimeter, and, discern one or more attributes of each object (eg., pedestrian not authorized to operate a fork lift, versus fork lift driver, the fork lift vehicle itself, certain machines or hazardous material areas, overhead hoists and so on). If the sensor detects one or more pedestrians, or in contrast a single fork lift, the alarm light might flash "yellow." If the sensor detects a single fork lift and one or more pedestrians—or else at least two fork lifts inside the perimeter—the alarm light might flash "red."

Alternatively, a single light might be combined with a dedicated sensor and mounted on a mobile object to protect, for example, that mobile object or else provide warnings to others about the hazard that the mobile object represents if not given appropriate respect of attention. A sensor and alarm light combination mounted on a fork lift will give the driver indications of pedestrians, or other fork lifts, or else other matters like overhead hazards and/or whether the fork has lift exceed a programmed boundary or location within a protected area.

An alternative configuration of the traffic signal system in accordance with the invention comprises a localized network of LED safety lights with sensors that are designed to detect objects within a perimeter as a warning system for 'protected floor spaces.' Battery powered sensors utilizing DECT ultra low energy (ULE) technology are strategically placed on all sides in proximity of a blind intersection (or corner) in order to detect oncoming traffic. Once someone or something travels into one of the sensors' area of detection, the sensor sends a signal to an LED light. The light is also strategically placed for traffic visibility from all sides. The housing of the light holds a battery and logic board. If a detection of one object is received, the logic board tells the light to turn yellow. If detection of another object is received from around the corner of the blind intersection, the logic board might tell the light to turn Red depending on who or what is the other object. Therefore, if one pedestrian or one fork lift enters the area of the blind intersection and is detected by the sensor, the pedestrian or fork-lift driver will see the yellow light indicating he or she is the only person/vehicle that is a moving object approaching the intersection. The yellow light also warns those who are further away and approaching from the other direction that there is already someone or something approaching the intersection prior to them reaching the range of the sensor's detection area on their side. If a second object enters the range of the second sensor and who is a pedestrian, the light will turn red if the first object was a fork lift. If both objects are pedestrians, the light will remain yellow. That way, both parties will be warned if something or someone they cannot see that is also approaching the intersection within the range of the sensors.

In some instances, two lights may be necessary when something like a door does not allow both parties to see the same light. In that case, the signals from one sensor could be sent to both lights. Using the same logic, signal from one fork lift turns the lights yellow and signals from two fork lifts turn the light red.

Further embodiments of the traffic signal system in accordance with the invention include the following.

A wireless mobile traffic warning light system in accordance with the invention to create a mobile traffic signal system for motor vehicle and/or pedestrian traffic, that provides detection and notification of a condition wherein a moving single detectable device (a "Transponder") of a plurality of Transponders and reader devices (a "Sensor") throughout the facility and connected together to protect the pedestrian or motor vehicle operator by signaling the detection of a traffic or safety hazard (eg., pedestrian, motor vehicle, operating or stationary hazard) and providing a signal warning of the hazard.

The warning light system includes the following components:

1) Stationary warning light system located in protected spaces where pedestrians and motor vehicle traffic share traffic aisles, hallways or workspaces. A single wireless mobile Sensor device of a plurality of Sensor devices strategically located throughout the protected area will activate stationary wireless traffic signal warning light(s) stationed to notify the detection of one or more pedestrians or motor vehicle operators in the Sensor area within shared traffic spaces or high hazard areas such as: traffic intersections, blind corners, doorways entering onto traffic ways, exiting rack aisles, moving overhead hazards (eg., crane rails), open dock edges, high hazard production or storage areas.

2) A transponder is a mobile detectable device worn by the pedestrian and operators of motor equipment (by way of an example the Transponder device could be located in a badge worn by all persons allowed in the protected area) that emits a signal that when within the system programmed range of Sensors connected to stationary warning lights, the Sensor(s) will activate the connected stationary warning light(s) to give notice to the pedestrians and motor vehicle operators that multiple personnel are detected within the shared traffic space sensor area so that they can avoid collision or other incident.

To assist in the programmed logic and activation of the warning light system, a Transponder may be assigned and specifically identified to the motor vehicle so that the warning light system may be programmed to only activate the warning light system in programmed situation such as when one or more of the Transponders picked up by the Sensors is operating in combination with a Transponder programed to a motor vehicle. This will allow activation or escalation to highest alert (eg., red warning light) only when there is a motor vehicle operating within the warning light sensor area.

3) A mobile warning light system located on motor vehicles operating within the protected area (interior or exterior) that includes mobile Sensors connected to the warning light system installed on the motor vehicle (eg., Installed on the underside of the roll rack of a fork truck). When the mobile Sensor on the motor vehicle detects another Transponder (in addition to the Transponder contained in the badge assigned to the motor vehicle operator) within the programmed range of the mobile Sensor, it will activate the warning light system installed on the motor vehicle. The warning light system on the motor vehicle is programmed to activate the motor vehicle's warning lights in the direction of the Transponder picked up by the mobile Sensor to give additional warning information to the motor vehicle operator.

4) A moving Hazard Mobile warning light system located on moving hazards without an onboard operator (eg., overhead crane rails with remotely operated by personnel through remote control devices or stationary switch devices) would include mobile Sensors connected to the warning light system that when the Sensor detects any Transponder approaching the programmed boundaries of the operating moving hazard, the Sensor would activate the warning light system attached to the moving hazard and/or the stationary warning lights located in proximity to the moving hazard.

5) Integration into operation controls is achieved with the connection of the wireless mobile Sensor devices into the operational controls (with on-board or remote operator) to stop (or temporarily pause) the motor vehicle or moving hazard to avoid impact with Transponder(s) detected by the Sensor(s) within programmed range (eg., pedestrians or other motor vehicles), or when exceeding the programmed boundaries of other high hazard areas (eg., rail road dock edges, high risk production areas, chemical storage, restricted access areas).

6) Warning of Operational or Stationary Hazards is achieved with the integration of the wireless warning system to alert motor vehicle operators and pedestrians of their proximity to system programmed high hazard areas within the facility (eg., dock and railway edges, crushers, presses, overhead crane rails, chemical use or toxic storage areas). System Sensors for both the stationary warning lights installed in the high hazard areas, and the mobile Sensor controlled light bars installed in the motor vehicles are programmed to signal YELLOW warning when a Transponder or wireless mobile detection device (eg., a badge assigned to the pedestrian or motor vehicle operator in this example) is detected within the programmed range of the high hazard area. The wireless mobile warning light system can also be programmed to signal RED when a Transponder or wireless mobile detection device exceeds a programmed boundary or location within the protected area. Additionally, the warning system can be programmed to signal OFF when the Sensor detects a: Transponder assigned to personnel (pedestrians or operators of motor vehicles) trained and assigned to work within the high hazard area (or in any programmable combination thereof).

Give the foregoing, a localized network of wireless mobile detection devices ("Transponders"), incorporated into apparatus worn by individuals (eg., an assigned badge in this example) in a protected area, are designed to activate a connected system of mobile traffic Sensors, that controls stationary and mobile warning lights for protected spaces or working areas such as encompassing blind intersections, corners of traffic way aisles, material handling equipment door openings, pedestrian crossings or entrance and exit ways, motor vehicle operation areas, heavy equipment operation or traffic areas, high hazard areas or others for both interior and exterior spaces as characterized and without limitation by what is found in commercial warehouses or industrial areas.

Battery powered LED stationary warning lights are strategically placed in the protected spaces in proximity of a traffic or safety hazards (eg., blind corner or intersection, pedestrian walkways, etc.) and connected to the interconnected warning light system that detects the Transponders and controls the actions of the stationary warning light(s). As an individual or motor vehicle operator equipped with a Transponder approaches one of the Sensor range areas, the Sensor detects the Transponder, activates and turns the warning light YELLOW. If a second Transponder comes within the warning light Sensor range while the light is still activated by the first Transponder, the Sensor turns the stationary warning light to RED. Once the number of Transponders within the Sensor area drops to one, the Sensor turns the stationary warning light to YELLOW, and once no Transponders are detected within the Sensor area, the Sensor turns the stationary light to OFF.

Mobile warning lights with mobile warning system Sensors are installed on motor vehicle equipment for mobile detection and warning to motor vehicle operators (eg., material handling equipment or other motorized vehicle) of traffic or safety hazards (eg., pedestrians, other motorized vehicles, operating hazards, etc.) using battery powered LED light bars installed on the motor vehicle (eg., material handling equipment) within easy eyesight of the motor vehicle operator. When one or more Transponders, (separate from the mobile detection device assigned to the operator of the motor vehicle) are detected by the motor vehicle attached Sensor, the Sensor turns the motor vehicle's Sensor attached light bars from the direction of the mobile detection device(s) to RED (light bars segmented to allow Sensor controlled activation of light bar segments from direction of detected Transponder). As Transponder(s) move out of range of detection, the system Sensor turns the light bars in the direction of the vacated Transponder to OFF, and when all Transponders move out of range of detection, the system Sensor turns all light bars on the motor vehicle to OFF.

Hazard detection and warning to motor vehicle operators and pedestrians of their proximity to high hazard areas existing within a protected space (eg., dock and railway edges, crushers, presses, overhead crane rail paths, chemical use or storage areas) can be programmed into the connected system of mobile traffic Sensors. System Sensors for both the stationary warning lights strategically installed in the high hazard area, and the system Sensor controlled light bar warning lights installed in motor vehicles can be programmed to signal YELLOW warning when a Transponder (including the mobile detection device worn by the motor vehicle operator) is detected within the programmed range of the high hazard area. The mobile warning system can also be programmed to signal RED when a Transponder exceeds a programmed boundary or location within the protected area. Additionally, the mobile warning system Sensor(s) can be programmed to signal OFF when the Sensor detects a Transponder assigned to personnel (pedestrians or operators of motor vehicles) trained and assigned to work within the high hazard area (or in any programmable combination thereof).

The warning light logic in this example is that a stationary YELLOW warning light will indicate warning to pedestrians and motor vehicle operators, both in and approaching protected spaces and areas, that there is single Transponder within the range of the Sensor protected space and area. Stationary RED warning lights will indicate warning to pedestrians and motor vehicle operators, both in and approaching protected spaces and areas, that there are two or more Transponders within range of the Sensor protected space. Motor vehicle mobile light bar RED warning lights will indicate warning to pedestrians and motor vehicle operators, both in and approaching the warning range of the motor vehicle equipment system Sensors, that there are one or more Transponders (separate from the Transponder worn by the motor vehicle operator) within range of the system Sensor attached to the motor vehicle.

In system programmed high hazard areas, stationary YELLOW warning lights and/or motor vehicle mobile light bar warning lights will indicate to pedestrians and motor vehicle operators that they are in close proximity to high hazard areas, and stationary RED warning lights and/or motor vehicle mobile light bar warning lights will indicate to pedestrians or motor vehicle operators that they have exceeded programmed boundaries or safe operation zones.

Further still embodiments of the traffic signal system include a camera assisted wireless mobile warning light system.

Camera assisted wireless mobile warning light system can be installed in a protected area (eg., a pedestrian and motor vehicle intersection within an industrial production and warehouse facility) for a camera assisted mobile traffic signal system in accordance with the invention to create a signal system for motor vehicle and/or pedestrian traffic within a facility or area, and depicting a condition wherein moving single Transponders, mobile detection device(s), of a plurality of Transponders, and camera assisted Sensor devices stationed or moving throughout a facility and connected together in a programmable mobile traffic warning system to protect the pedestrian or motor vehicle operator by signaling the detection of a traffic hazard (eg., pedestrian, motor vehicle, operating hazard) and providing a signal warning of the hazard to pedestrians and motor vehicle operators and camera representation to the motor vehicle operator of the motor vehicle and detected hazard in the programmed range of the protected area.

In addition to the stationary warning light system strategically installed at traffic safety hazards (eg., traffic intersections, pedestrian crossings, motor vehicle door openings, or other traffic hazards including high hazard areas) and the mobile light bar warning system installed within operating motor vehicles as shown in prior examples, the mobile traffic warning system can be integrated with system connected cameras positioned throughout the protected area and adhered to the motor vehicle. These system connected cameras would provide three dimensional images of the area and the moving motor vehicle operating within the protected area. The motor vehicle would be equipped with a portable monitor that when activated by the wireless mobile Sensor device detecting a Transponder, the monitor will provide three dimensional image representation of the motor vehicle and the detected Transponder(s), (or other programmable objects such as proximity to high hazard areas or stationary objects) present and moving within the Sensor range with programmable warning indication of hazard alert and action to be taken.

Utilizing the composition of images compiled by all area installed camera angles and images from the cameras installed on the motor vehicle, the motor vehicle monitor will display an aerial view of the motor vehicle moving throughout the facility and alert the motor vehicle operator of non-viewable safety hazards (eg. nearby pedestrians, operating motor vehicles or high hazard areas blocked by other objects such as racking, production equipment, walls, curtains, doors, blind corners, etc.) within the programmed alert range. Camera Sensors located on the motor vehicle can be programmed to alert the motor vehicle operator for collision with stationary objects as the motor vehicle moves throughout the area. All camera images and Sensor information, including movement of Transponder(s), transmitted throughout the integrated mobile traffic signal system are transferrable to connected data storage devices to allow for incident recording and review, traffic flow analysis, security purposes or other uses.

Further integration of wireless mobile Sensor devices into motor vehicle operational controls can stop (or temporarily pause) the motor vehicle to avoid impact with other wireless mobile detection devices (eg., Transponders assigned to pedestrians or other motor vehicles), programmed high hazard areas, or other stationary objects.

Other Safety Features for an expanded or alternate system include the following.

Variable signals or alarms can be activated based on the assigned credentials programmed to the Transponder (ie. badge) that has been detected by the Sensor. Expanded signal logic beyond the YELLOW Signal for one Transponder detected, RED Signal for two or more Transponders detected and OFF for no Transponders detected can include multiple signals and variations that are specific to the Transponder detected by the Sensor. The variable signals or alarms are controllable by the system and can be programmed to be effective in the installation environment for the hazards present.

Assigning Transponder devices to motor vehicles or other hazards that are in the protected space expands the programmable logic of the warning system to increase the variations in the warning signals, alarms or other actions. This allows the warning signal to be more specific and relevant to the classified identities detected by the Sensors. A simple example of the variable signal includes: a Transponder device is attached to a motor vehicle and programmed with the classified identity of a motor vehicle (eg., Fork Lift); the operator of the motor vehicle has an assigned Transponder device (eg., Badge) with the classified identities of a motor vehicle operator AND a pedestrian since when not on equipment he will be detectable as a pedestrian; an office worker who is always a pedestrian when moving in the protected space will be assigned a Transponder device with the classified identity of a pedestrian. The warning system can be programmed to activate a YELLOW SOLID light signal when the Sensors detect ONE or MORE Transponders with classified identities of pedestrians in the Sensor area; the system can be programmed to activate a YELLOW FLASHING light signal when the Sensors detect ONE Transponders with the classified identity of motor vehicle (the system is programmed to link the Transponder worn by the operator of the equipment to the Transponder assigned to the motor vehicle for combined detection of identities to the system); the system can be programmed to activate a RED FLASHING light signal when the Sensors detect ONE Transponder with motor vehicle identity AND the Sensors detects ONE or MORE second Transponder(s) with motor vehicle or pedestrian identities.

Variable Signals or Alarms with Symbols or Messaging can be utilized to communicate the specific safety warning or to integrate messaging of other safety controls present in the protected space. In place of a solid or flashing YELLOW or RED light signal, the Sensor can be connected (wired or wirelessly) to a signal that will communicate to the approaching individual (operator or pedestrian) what type of classified identity or hazard is approaching the Sensor area from another direction (eg., traffic way intersection or blind corner) or within programmed safety range of the Sensor (eg., operating overhead crane rail). The type of signal symbol or message is variable and programmable to the Sensor area and can include, by way of an example, an outline of pedestrian to represent the Sensor detection of Transponder(s) with a classified identity of pedestrian; an outline of a fork truck to represent the Sensor detection of Transponder(s) with a classified identity of a fork lift motor vehicle; a message "OVERHEAD HAZARD" to warn of the Sensor detection of Transponder(s) with a classified identity of an overhead crane rail.

An example of the Variable Signals with Symbols or Messaging based on the Transponder identities described in the example above and as they are approaching a T-intersection with an overhead crane rail and hoist operating beyond one end of the intersection would include: a Transponder device attached to a fork lift with the classified identity a fork lift; the operator of the motor vehicle with a Transponder device with classified identities of a fork lift operator AND a pedestrian; an office worker with a Transponder device with the classified identity of a pedestrian; a Transponder device attached to an overhead crane rail and hoist with the classified identity of overhead crane rail.

The safety warning system Sensors will detect the identity classification of the Transponder(s) and will signal to the intersection's opposing directions the symbol or message programmed for the highest risk associated (as prioritized in system) for the Transponder identities within Sensor range. The system can be programmed to activate a PEDESTRIAN symbol signal to opposing sides of the intersection when the Sensors detect ONE or MORE Transponders with classified identities of pedestrians in the Sensor area; the system will activate a FORK LIFT symbol signal and present to all opposing sides when the Sensors detect ONE Transponders with the classified identity of fork lift (the system is programmed to link the Transponder worn by the operator of the equipment to the Transponder assigned to the motor vehicle for combined detection of identities to the system)—in this situation where there is only ONE fork lift approaching the T-intersection and the other Transponders are identified as Pedestrians, the system will present the PEDESTRIAN symbol signal to the direction of the ONE fork lift; the system will activate a "OVERHEAD HAZARD" message signal when the Sensors detect ONE or MORE Transponder (s) with Overhead Crane Rail identity AND the Sensors detects ONE or MORE second Transponder(s) with motor vehicle or pedestrian identities. When there are multiple high risk hazards, such as an operating overhead crane hoist and fork lift, a combination of multiple signal or messaging devices can be utilized for safety warning of the multiple hazards. The same signal light color as the prior examples is utilized with YELLOW SOLID symbol or message signal color utilized when ONE or MORE pedestrians are within the range of the Sensors, YELLOW FLASHING symbol or message signal color utilized when ONE motor vehicle or other classified high hazards such as crane rails are detected within range of the Sensors, RED FLASHING symbol or message signal when ONE motor vehicle or other classified high hazards such as overhead crane hoist are detected within range of the Sensors AND ONE or MORE other Transponders (eg., pedestrians or motor vehicles or other classified high hazard) is detected within range of the Sensors.

The Variable Signal with Variable Symbols and Messaging option starts with the YELLOW, RED or OFF light signals and extends to Transponder specific symbols and messaging to opposing traffic and on to verification and messaging of safety clearance and programmable access controls. Protected area specific programming of Transponders classifications and identities controls the warning signals and alarms presented or actions taken (eg., locked door access or operational control pause or stop). A table with examples of possible warning system signaling and controls are presented in the TABLE 1 and TABLE 2 below.

TABLE 1

AUTHORIZATION SIGNS AND/OR ACTIONS
for message capable signals

| Description of Restricted Areas, Processes or Equipment | Authorized | Visitor | Worker | Contractor | Security | Truck Driver | OSHA | Trainer | Custom |
|---|---|---|---|---|---|---|---|---|---|
| Trained for area Hazard | Yes | A | A | A | A | A | A | A | A |
| | No | U, R, L, C | U, R, L, C | U, R, L, C | U, R, L, C | U, R, L, C | U, R, L, C | U, R, L, C | U, R, L, C |
| Department | Yes | A | A | A | A | A | A | A | A |
| | No | U, R, L, C | U, R, L, C | U, R, L, C | U, R, L, C | U, R, L, C | U, R, L, C | U, R, L, C | U, R, L, C |
| Shift | Yes | A | A | A | A | A | A | A | A |
| | No | U, R, L, C | U, R, L, C | U, R, L, C | U, R, L, C | U, R, L, C | U, R, L, C | U, R, L, C | U, R, L, C |
| Operation of Equipment | Yes | A | A | A | A | A | A | A | A |
| | No | U, R, K, C | U, R, K, C | U, R, K, C | U, R, K, C | U, R, K, C | U, R, K, C | U, R, K, C | U, R, K, C |
| Access | Yes | A, O | A, O | A, O | A, O | A, O | A, O | A, O | A, O |
| | No | U, R, L, C | U, R, L, C | U, R, L, C | U, R, L, C | U, R, L, C | U, R, L, C | U, R, L, C | U, R, L, C |
| Hazard in Area | Yes | A | A | A | A | A | A | A | A |
| | No | D, U, R, K, L | D, U, R, K, L | D, U, R, K, L | D, U, R, K, L | D, U, R, K, L | D, U, R, K, L | D, U, R, K, L | D, U, R, K, L |

| Legend | Sign Reads | Legend | Possible action |
|---|---|---|---|
| A | Authorized | K | Kill power |
| U | Unauthorized | L | Lock |
| C | Custom | O | UnLock |
| D | Description of Hazard* | R | Light Turns Red |

(*i.e. Overhead Hoist, Welding Flash, Rail Edges, Hard Hat Area, etc.)

TABLE 2

SIGN/SIGNALS FOR VARIOUS SITUATIONS
for symbol capable signals

| Sign Seen by the Described | Pedestrian Approaching | Equipment with Operator Approaching | Hazard |
|---|---|---|---|
| Pedestrian | P | P | P |
| Approaching | P | E | H |
| Equipment with | E | E | E |
| Operator | P | E | H |
| Approaching | | | |
| Hazard | H | H | H |
| | P | E | H |

| Legend | Sign Reads |
|---|---|
| P | Image of Pedestrian |
| E | Image of Equipment* |
| H | "Hazard" |

(* i.e. Image of Forklift)

Wireless Sensor and Signaling devices with LED light signals and Sensors powered by battery and connected wirelessly to the safety warning system allow the warning light Sensors and signals to be installed anywhere within the protected area as there are no hard wired electrical or data lines necessary to power or connect the Sensor or signal to the safety warning system. The Sensors and signaling devices can also be connected wirelessly to each other to allow multiple Sensors to activate the same signaling devices and multiple signaling devices to be activated by the same Sensors as programmed in the safety warning system to be most effective in the environment. The wireless Sensor and signal devices are programmed to signal based on the classified identity of the Transponders detected within range of the Sensors. Examples of the possible applications of the Wireless Sensor and Signaling devices include:

1) Sensor and signal light installed at the end corner of industrial storage racking as it joins shared material handling vehicle (i.e. fork lift) traffic ways.
2) Sensor and signal lights suspended over shared traffic ways or pedestrian walkway entry points.
3) Sensor and signal lights installed on exterior fencing at gate entry points and construction vehicle shared traffic entrances such as road construction areas where dump trucks, heavy loaders and equipment, contractor pick-ups and pedestrians can be present.
4) Sensors installed at railway dock edges that are wirelessly connected to signaling devices suspended from the ceiling in front of the dock edge to signal warning to pedestrians and motor vehicle operators of their proximity to the open dock edge. The ability to wirelessly connect multiple Sensors to multiple warning signal devices through the safety warning system, allows the Sensors installed at the railway dock edge to also activate any warning light bar or monitor installed on the motor vehicle with indication of the direction (in the case of the warning light bar with activated light segments from the direction of the hazard) or the image and programmed warning message (in the case of the safety system monitor installed on the motor vehicle.

Sensors and signal devices installed on poles, surfaces or portable supports, such as tri-pods or safety cones, for permanent or temporary usage or where no other structural attachment points are available. Utilizing the LED light signals and Sensors powered by battery and connected wirelessly to the safety warning system allows the warning light Sensors and signals to be installed anywhere within the protected area as there are no hard wired electrical or data lines necessary to power or connect the Sensor or signal to the safety warning system. The Sensors and signaling devices can also be connected wirelessly to each other to allow multiple Sensors to activate the same signaling devices and multiple signaling devices to be activated by the same Sensors as programmed in the safety warning system to be most effective in the environment. The wireless Sensor and signal devices are programmed to signal based on the classified identity of the Transponders detected within range of the Sensors Examples of the possible usage for pole, surface or portable Sensor and signal device mounting apparatus are listed below:

a. Surface or Pole mounted Sensors can be installed in surfaces (eg., floors, roads, right of ways, dock edges) or erected within exterior areas that do not have other structures to support the attachments. For example, in exterior, high traffic, industrial distribution areas with over-the-road truck and trailer traffic merging onto drive ways and dock access areas that also have other traffic including fork trucks, pedestrians, contractor trucks, visitor or facility worker vehicles, all within the protected space and assigned an appropriately classified Transponder identity, surface or pole mounted Sensors strategically placed within the distribution area and access points can monitor traffic flow and potential hazards and signal variably programmable warnings to approaching traffic using the Transponder(s) classified identity that is approaching from an opposing traffic way. Additionally, using the safety warning systems programmable Transponder classifications of identity priority settings to determine and signal who has priority at system controlled intersections and the standard RED/YELLOW/GREEN traffic light signal logic, the Sensors can activate safety signals to direct oncoming traffic to STOP for RED signals, use CAUTION for YELLOW signals, and signal priority to GO forward with GREEN signals at traffic intersections or pedestrian defined crosswalks.

b. Tri-pod mounted Sensors can be erected at the perimeter of areas with hazardous safety activities such as welding where eye damage may occur if the welder flash is viewed without proper eye protection. The tri-pod mounted Sensors and signaling devices can be positioned to detect Transponders within Sensor range and approaching the tri-pod mounted Sensor area and activate the tri-pod stationed signals using a warning light, symbol or message as programmed in the safety warning system.

c. Safety cone mounted Sensors can be erected around temporary maintenance or construction being performed by maintenance personnel or outside contractor workers. Safety cones with mounted Sensors and signaling devices are positioned within safe distance from the work being performed. The safety warning system is programmed to signal OFF when Transponders devices (ie badge) assigned to the workers completing the maintenance or construction are detected with the Sensor range as AUTHORIZED to be within the Sensors area. When the safety warning system Sensors detect a ONE or MORE Transponder(s) within range, the Sensor will activate the warning signals mounted on the safety cones. The Sensors can be programmed to activate all safety cone mounted signals installed at the work area, or activate only the safety warning signals in the direction of the detected Transponder to direct the attention of safety monitoring personnel (or personnel completing the work) to the area of the Sensor detected Transponder.

d. In examples a, b, and c above, the same signal light color logic is utilized with YELLOW SOLID symbol or message signal color utilized when ONE or MORE pedestrians are within the range of the Sensors, YELLOW FLASHING symbol or message signal color utilized when ONE motor vehicle or other classified high hazards such as crane rails are detected within range of the Sensors, RED FLASHING symbol or message signal when ONE motor vehicle or other classified high hazards such as overhead crane hoist are detected within range of the Sensors AND ONE or MORE other Transponders (eg., pedestrians or motor vehicles or other classified high hazard) is detected within range of the Sensors.

Escalation of signaling based on location of detected Transponder within the Sensor detection range is a programmable option causing the warning signal to increase the level of alarm as the Transponder detected moves closer to the Sensor. The variable level of alarm signaled can be programmed to each Sensor and can include activation of ALTERNATING RED/YELLOW light signal and an audible alarm sound when an UNAUTHORIZED Transponder is detected within programmed close proximity to the Sensor. This increases the warning to the approaching Transponder and, with the audible alarm, alerts the safety monitor and/or AUTHORIZED workers present that someone is exceeding safety boundaries so they can address the safety risks.

Portable, Stand-alone Safety Warning System using Sensors and signal devices installed on poles, surfaces, or portable supports, such as tri-pods or safety cones, can be utilized for permanent or temporary usage or where no other structural attachment points are available. Utilizing the LED light signals and battery powered Sensors connected wirelessly to all Sensors in a self-contained, linked system allows the warning light Sensors and signals to be installed anywhere (interior or exterior) as there are no hard wired electrical or data lines or master system necessary to power or connect the linked Sensors and signals. The wireless connection of Sensors and signaling devices allow multiple Sensors to activate the same signaling devices and multiple signaling devices to be activated by the same Sensors as variably programmed to be most effective in the stand alone environment. Since this is a Stand-Alone safety system that is not connected to any larger master system of a protected area, the only Transponder devices (i.e. badge or surface mounted tag) assigned will be to the AUTHORIZED workers, motor vehicles or other moving items present in the area (eg., moving conveyor equipment beside Sensor controlled area) allowed to work in and around the Sensor monitored area. If the Sensors detect any UNAUTHORIZED entries to the Sensor area (using a combination of motion, face recognition, heat transfer or other detection methods), the wireless Sensor devices are programmed to activate the signal devices based on the programmed variable signal for an UNAUTHORIZED classified identity detected within range of the Sensors. Sensor range can be adjusted through placement of Sensors or adjustment of Sensor range to eliminate the detection of nearby UNAUTHORIZED motion that is within the Sensor area. Irregular shape Sensor areas can be achieved with placement of Sensor limiting devices that when linked to another Sensor limiting device creates a de-activation line between the two Sensor limiting devices. The Sensors will stop detection at the de-activation line. Multiple Sensor limiting devices can be placed within the Sensor range to create a custom Sensor area.

The variable level of alarm signaled can be programmed to each Sensor and can include activation of ALTERNATING RED/YELLOW light signal and an audible alarm sound when an UNAUTHORIZED Transponder is detected within programmed close proximity to the Sensor. This increases the warning to the approaching individual or motor vehicle and, with the audible alarm, alerts the safety monitor and/or AUTHORIZED workers present that someone is exceeding safety boundaries so they can address the safety risks.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
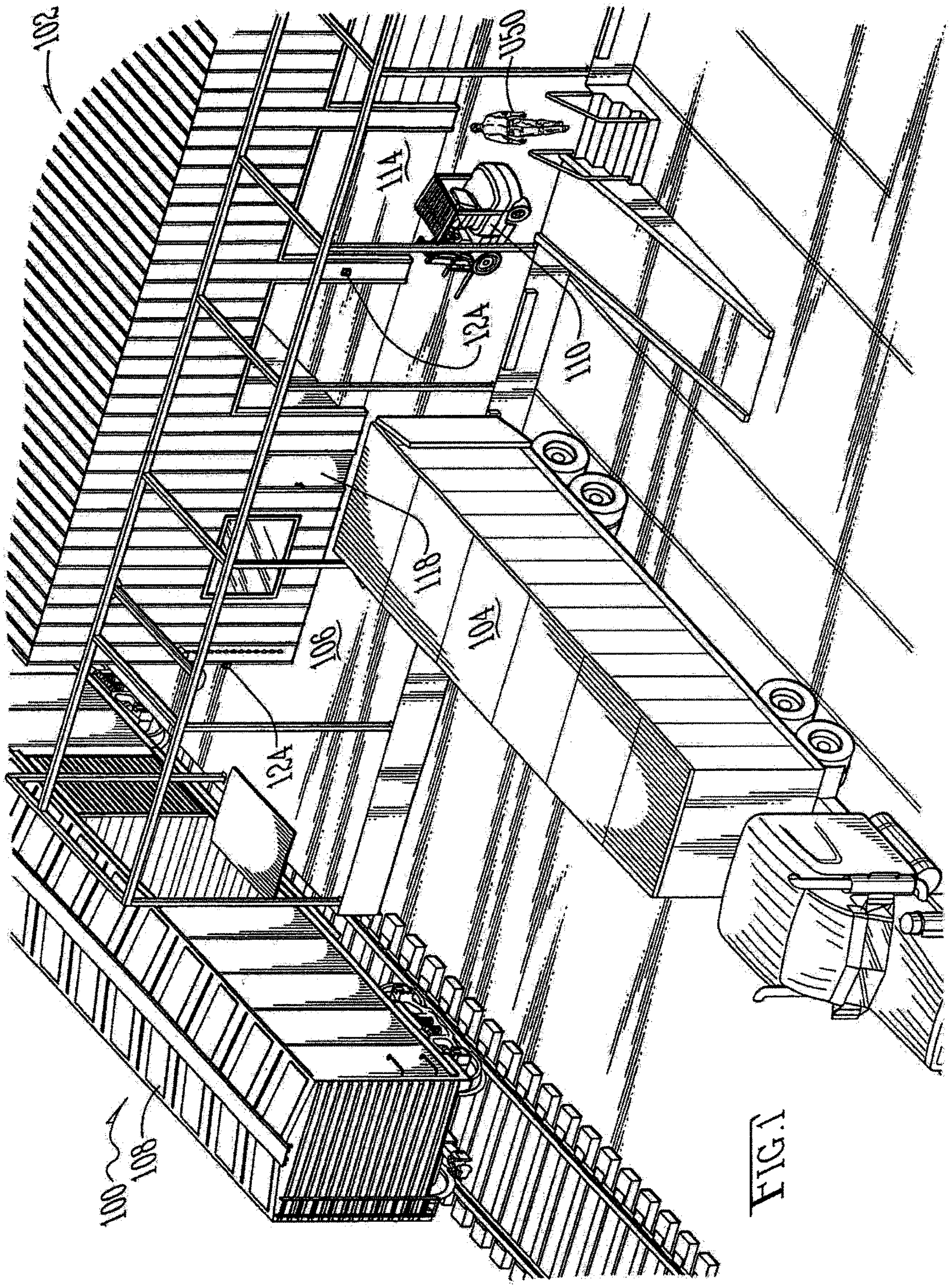
FIG. 1 is a perspective view of an example environment equipped with a traffic signal system in accordance with the invention for congested trafficways.

FIG. 1 is a perspective view of an example environment for a traffic signal system 100 in accordance with the invention. It is designed to serve in particular, congested trafficways 102 for both indoor, outdoor, overhead (eg., cranes, hoists) and underfoot (eg., ledges) hazards which have both vehicular and pedestrian traffic. A semi-trailer 104 is backed up to a loading dock 106. A train car 108 sits at a siding of the same loading dock 106. A fork lift 110 is free to drive all over the loading dock 106 to lift out or set down freight with respect of either the trailer 104 or train car 108. The fork lift 110 is also free to drive off the edge of the dock 106 if the driver is not careful (or warned by the system 100 in accordance with the invention, or shut off). A pedestrian U50 has walked up steps to alight on the loading dock 106, but in the blind spot of the driver of the fork lift 110.

The fork lift 110 has a helm from where the driver drives the fork lift. The helm 110 is protected in a cage, the cage has a ceiling, and mounted in the ceiling is a light bar 112 as shown better in FIGS. 18-20 and 22. The helm might also have a dashboard with a display or screen to provide a map for the driver of his or her terrain at the present time. Preferably the display for the driver is a schematic in plan view in 360°. The objects of interest to the driver include:—

- drop offs,
- blind hazards around corners,
- blind hazards just past through roll-up (garage) doorways 114,
- blind hazards to the behind,
- overhead hazards that can drop or move hazardously, like cranes and chains,
- and not just static blind hazards but also moving blind hazards, like:—
  - other vehicular traffic on a path to interfere,
  - pedestrian traffic,
  - including pedestrian traffic about to emerge from anywhere.

A pedestrian U50 is shown having emerged onto the dock after walking up low steps. As an alternative, a vehicle or pedestrian could be emerging out of any of the roll-up (garage) doorways 114, from around a blind corner, from out of either the trailer 104 or train car 108, or in the case of pedestrians, emerging out of the swing door 118 from out of the office.

Transponders 120 (see, eg., FIG. 13) It is an aspect of the invention to put an RFID device 120 on all hazards. This includes cargo (with information of nature, whether sensitive electronics or hazardous material), pedestrians (whether employees or visitors), fork lift and/or machine operators, vehicles (including in particular the fork lifts), trailers, train cars, visitor trailers and tow vehicles, chains dangling from overhead lifts, traveling gantries for overhead lifts/cranes, scissor lifts/aerial work platforms, boom lifts/aerial work platforms, roll-up (garage) doors, and so on without limitation. The RFID devices 120 can be passive, semi-active or active. Active are preferred because active RFID's 120 provide better range and better programmability.

Figure 11:
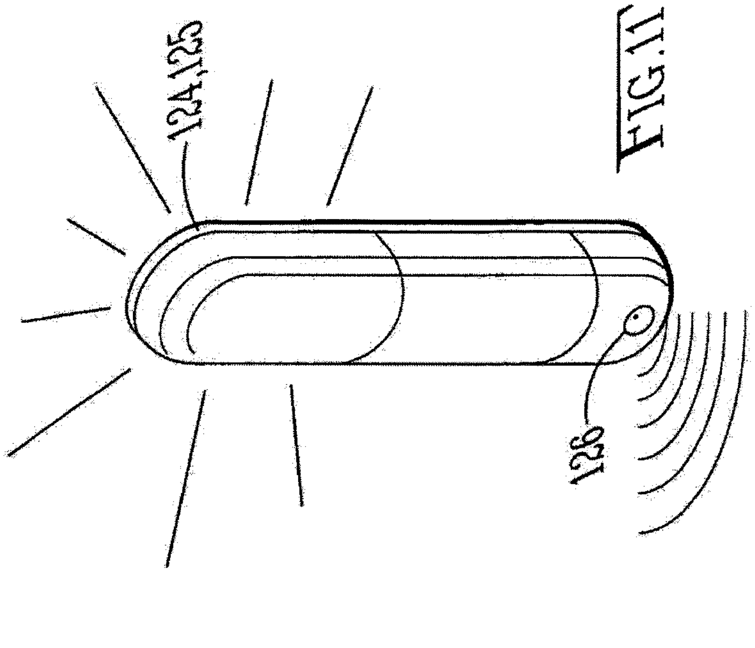
FIG. 11 is a perspective view of a combination alarm light and sensor/reader in accordance with the invention, glowing or flashing red.

Sensors 124 (see, eg., FIG. 11). It is a further object of the invention to populate the landscape with a strategically disposed distribution of spaced sensors 124—or RFID readers 124—to locate and track the transponders 120.

Information Annunciator 125-126 (see, eg. FIG. 11) and/or Display systems. It is a complementary object of the invention to compile the evolving picture of what's transpiring over the network and serve that information in meaningful ways to the benefits of users of such information:—such users including without limitation the vehicular traffic operators (ie., the operators of any of the fork lifts, scissor lifts, boom loaders, hoists, cranes, visitor tow vehicles, visitor trailers and so on). A non-limiting example of the nature of the diagrammatic information that might be offered by such a display would be something like a plan view of the traffic environment 102, as shown next in FIG. 2.

Figure 2:
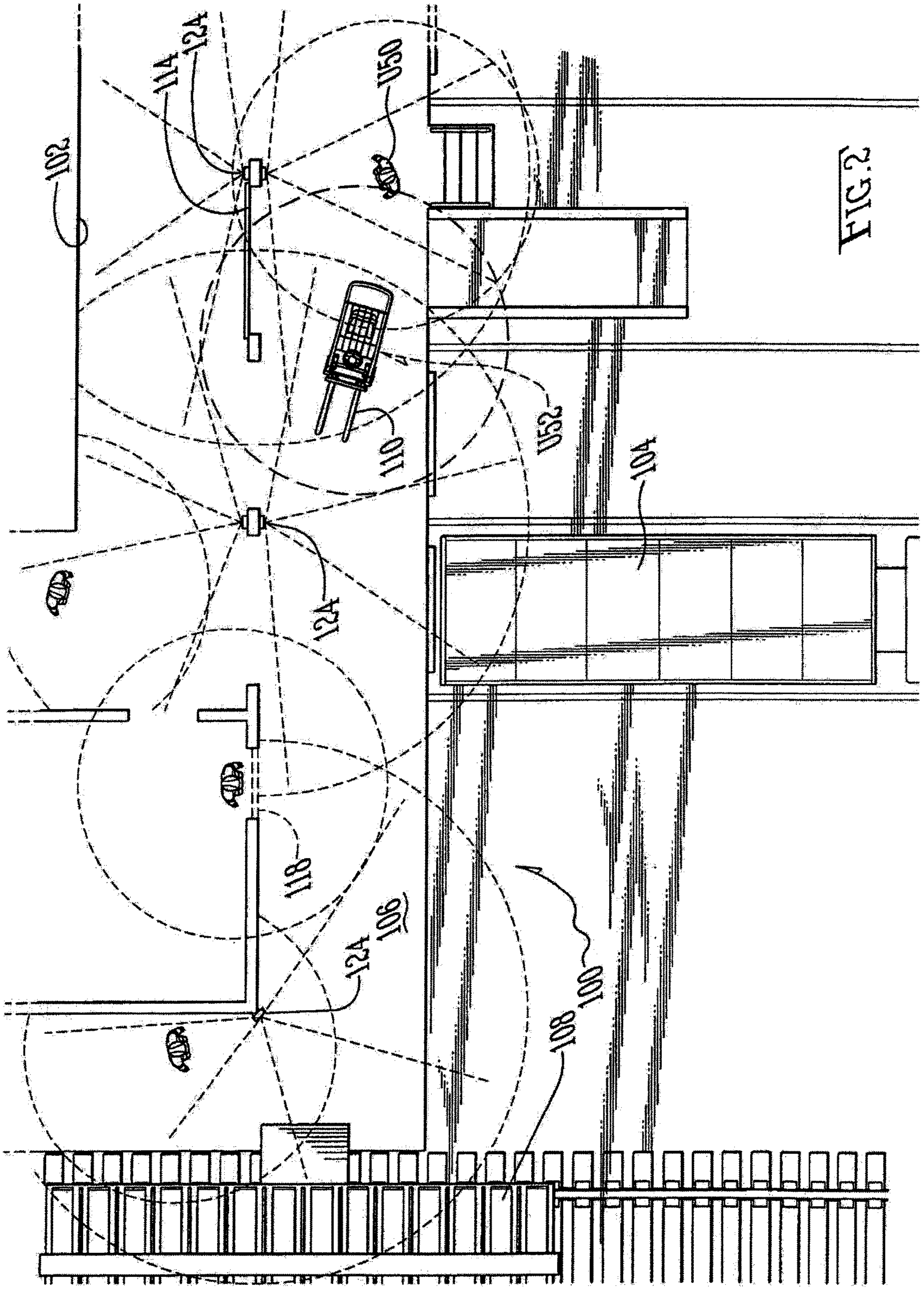
FIG. 2 is a plan view of FIG. 1 showing various objects to be detected and/or protected by the traffic signal system in accordance with the invention.

FIG. 2 is a plan view of FIG. 1. This FIG. 2 could actually be an electronic display served in real time to the fork lift operator U52 in the fork lift 110 in the center of the view. This view shows sensors 124 (which are combined with alarm lights 125, see, eg., FIG. 11) on corners and on posts of roll-up (garage) door openings 114. A pedestrian U50 is walking up the steps to the loading dock but behind the fork lift 110, the driver U52 of which would be likely unaware of the pedestrian U50 if not for the system 100 in accordance with the invention.

The fork lift 110 is in all likelihood electric. It is quiet. The loading dock 106 is otherwise a beehive of activity, and, noisy. Hence, the visitor U50 is just as likely to gullibly walk into harm's way because the ordinary sense of an oncoming vehicle—noise—is too remote to help the visitor. To be sure, if the fork lift 110 shown in the view were reversing, it would likely have a reversing alarm.

However, if there were dozens of fork lifts or other vehicles in this environment with reversing alarms also, and about a half dozen were reversing and alarming all at the same time, the result is noise confusion. This environment 102 is a 'hard' environment for noise reflection, and the alarms of a half dozen vehicles would be echoing through the environment such as to not only make it deafening but at the same time difficult to discern a close-by threat from a remote one. Also, with so much noise in the environment at all times, workers and guests alike develop noise fatigue.

Hence just making a single vehicle 110 alarmingly noisy when it reverses despite the fact that its motive power is about as silent as stealth can go, does not make it stand out in swarm of beehive activity, with a lot of other 'angry bees' (reversing vehicles) alarming all at the same time.

Figure 3:
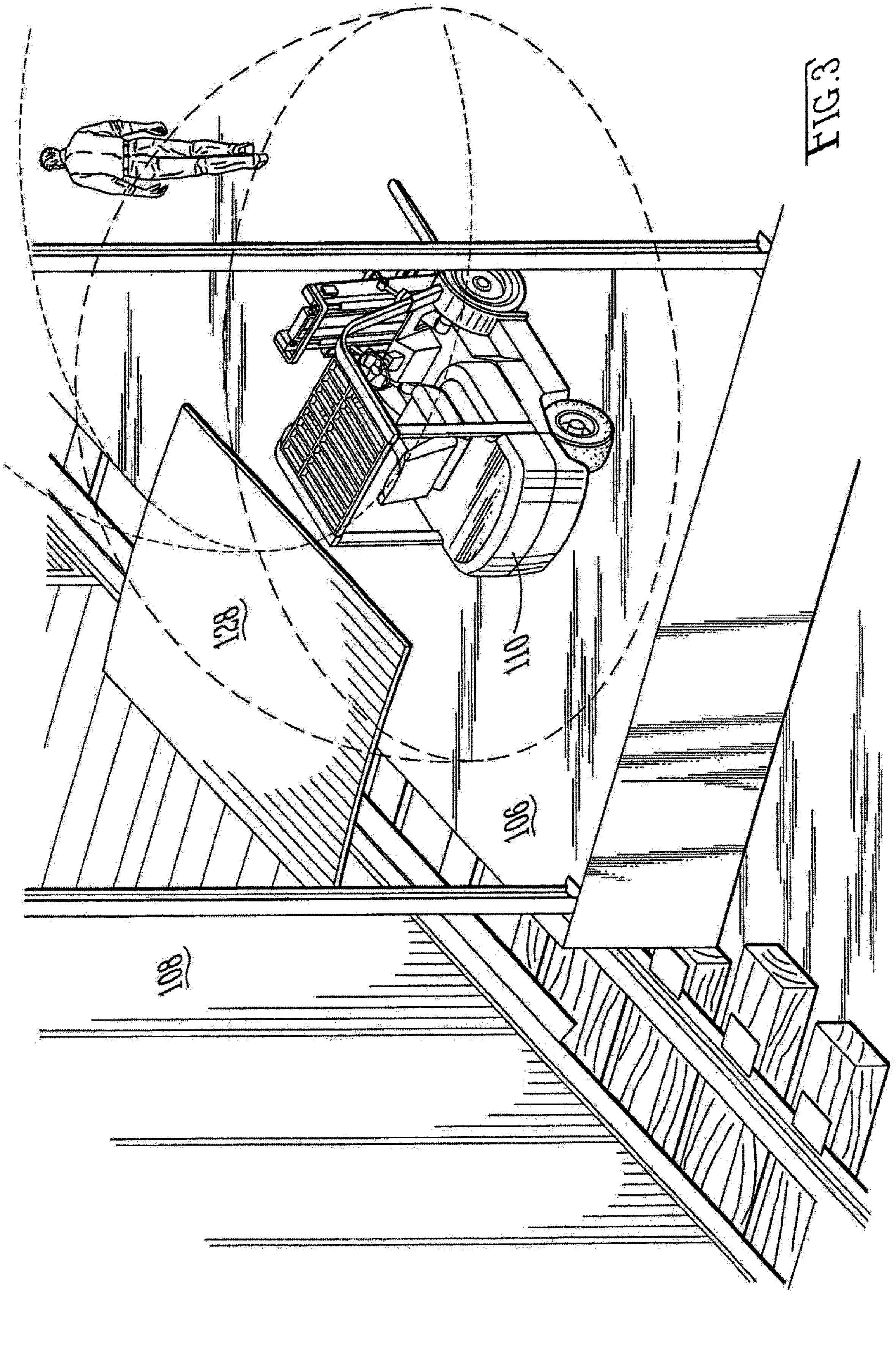
FIG. 3 is an enlarged scale perspective view of a detail of FIG. 1 showing a fork lift in the corner of the dock proximate the train car and a bridge from the dock to the access to the train car.

FIG. 3 is an enlarged scale perspective view of a detail of FIG. 1 showing a fork lift 110 in the corner of the dock 106 proximate the train car 108 and a bridge 128 from the dock 106 to the access to the train car 108.

Figure 4:
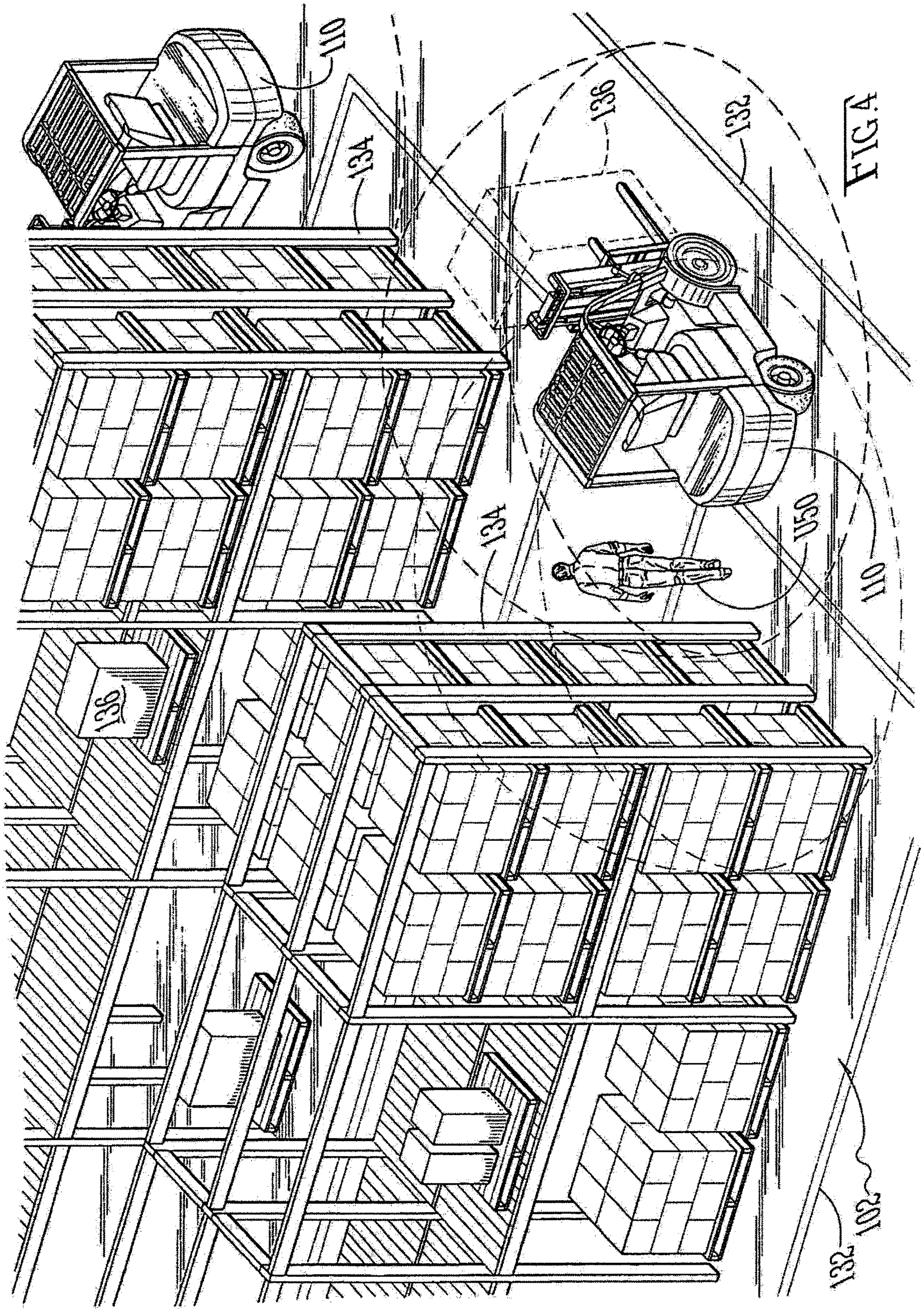
FIG. 4 is a perspective view inside the warehouse (the exterior of which is shown in FIG. 1), and showing the labyrinth of marked trafficways for both vehicles as well as pedestrians, and densely packed high-rise shelving for palleted cargo.

FIG. 4 is a perspective view inside the warehouse 102, and showing the labyrinth of marked trafficways 132 for both vehicles 110 as well as pedestrians U50, and densely packed high-rise shelving 134 for palleted cargo 136. When the fork lift driver is driving a fork lift 110 with a fairly tall carton of palleted cargo 136, he or she has a blind spot directly in front of him or her.

Figure 5:
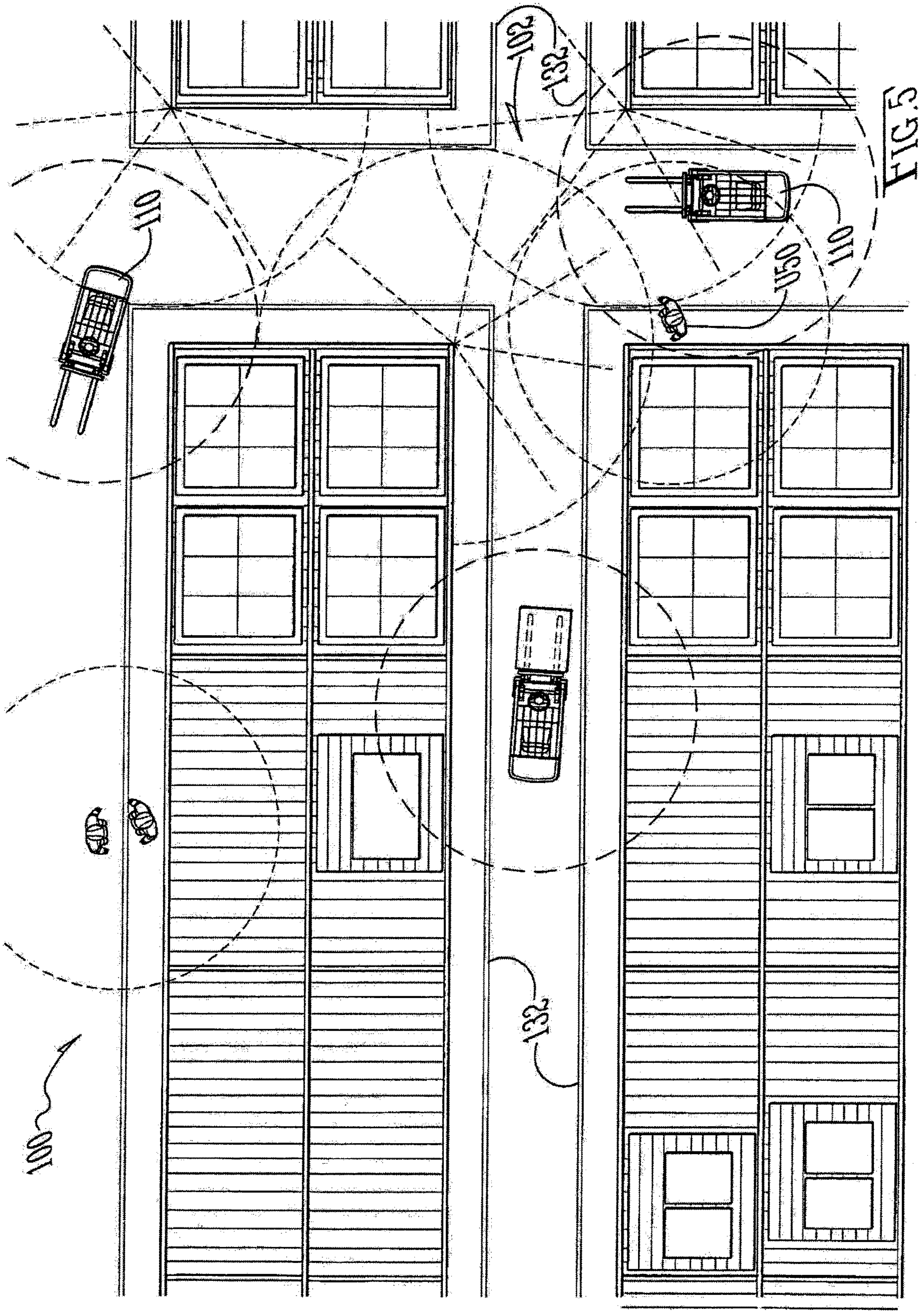
FIG. 5 is a plan view of FIG. 4.

FIG. 5 is a plan view of FIG. 4. The fork lift 110 in the aisle 132 is blind both to approaching fork lift 110 and pedestrian U50. A display in accordance with the invention would provide all users (eg., U50 and U52) of the network 100 with a plan view schematic as shown with updated moving information of all the relevant actors (eg. 110 and U50).

Figure 6:
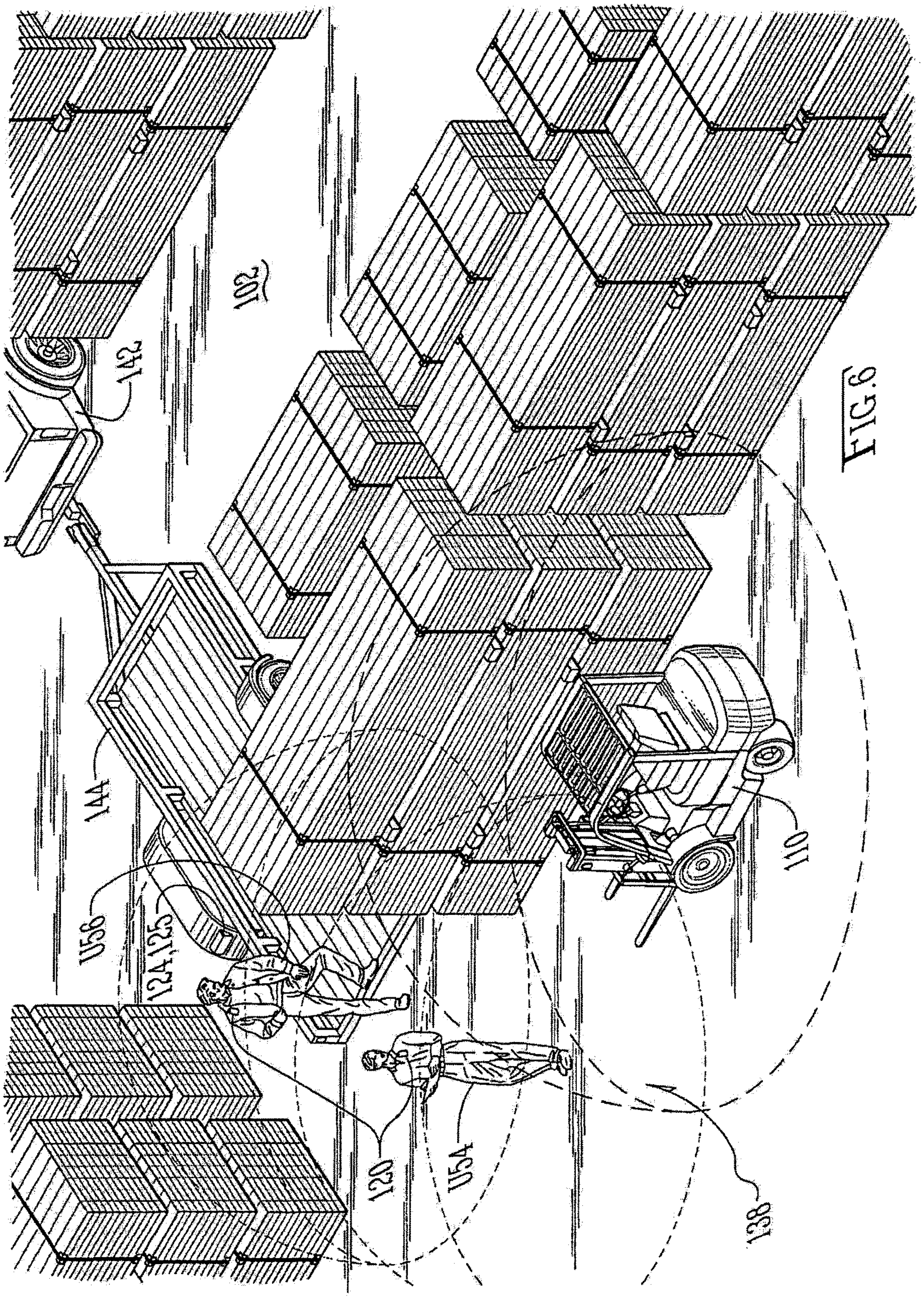
FIG. 6 is a perspective view of an outdoor lumberyard furnished with a traffic signal system in accordance with the invention.

FIG. 6 is a perspective view of an outdoor lumberyard 138 furnished with a traffic signal system 100 in accordance with the invention for congested trafficways 102. The employee U54 has been issued and is wearing a transponder 120 (that being an easy aspect of the network pre-arranging). But the variable actor in this landscape is the visitor party. This includes all individuals U56 of the visitor party, any tow vehicle 142, and any trailer 144. Preferably visiting people U56 are issued a transponder on a temporary basis, while the tow vehicle 142 and trailer 144 might be issued a combination alarm light and sensor/reader 124-125 (see, eg, FIGS. 11 and 12).

Figure 7:
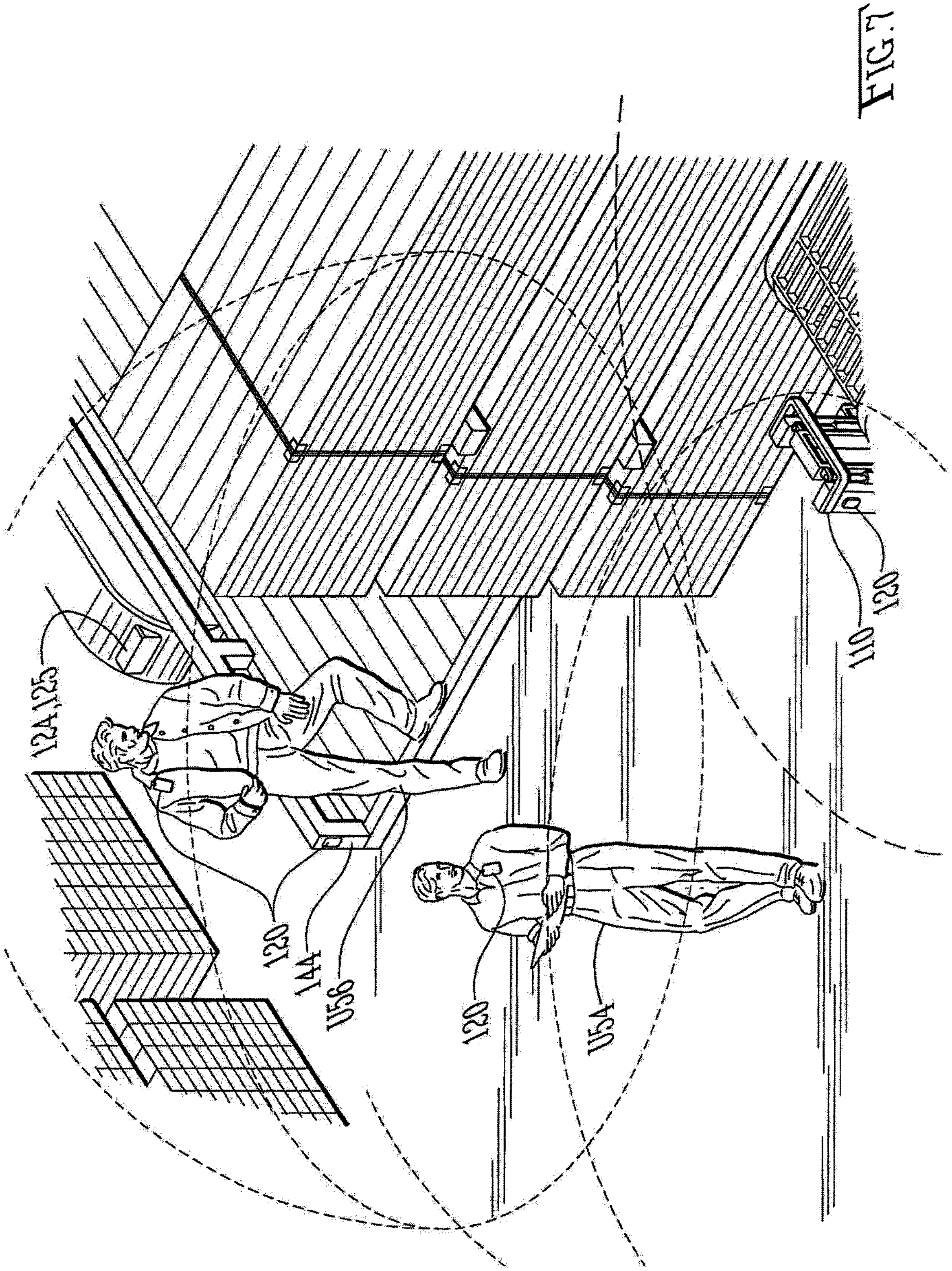
FIG. 7 is an enlarged scale perspective view of detail from the center of FIG. 6.

FIG. 7 is an enlarged scale perspective view of detail from the center of FIG. 6 showing a transponder 120 on the visitor U56 and other devices 124-125 on the visitor's trailer 144 respectively.

Figure 8:
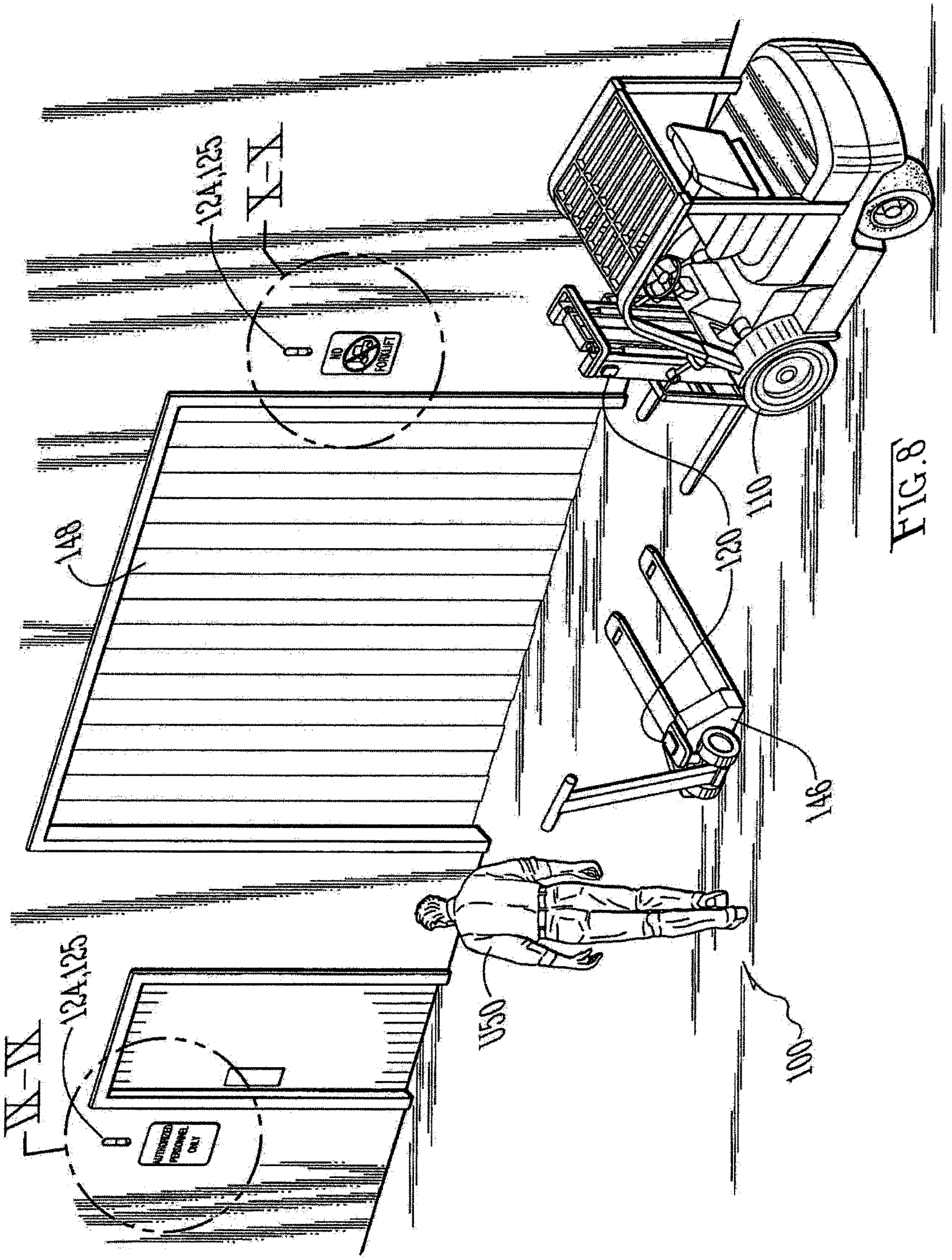
FIG. 8 is an enlarged scale perspective view of detail from the upper center of FIG. 1.

FIG. 8 is an enlarged scale perspective view of detail from the upper center of FIG. 1, except wherein the fork lift 110 and pedestrian U50 are re-located, and introducing a hand dolly 146. The hand dolly 146 might also be tagged with a transponder 120. The garage door 148 is closed. Not only that, but the cargo (not shown) behind the garage door 148 is only safe to be trucked by a hand dolly 146, and not a forklift 110. The sensor 124-125 would alarm the network 100 if that requirement were about to be violated either by sending numerous warnings to fork lift driver or standers-by, or else, sending a 'shut down' instruction to the fork lift 110. Such cargo (again, not shown) could be hazardous chemicals or otherwise.

Figure 10:
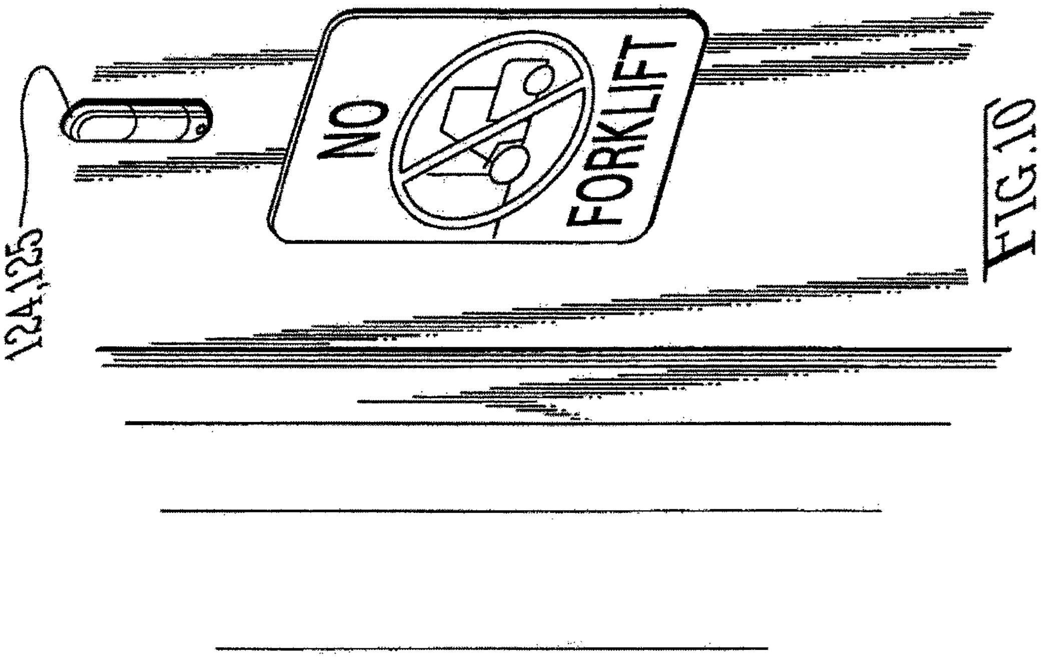
FIG. 10 is an enlarged-scale perspective view of detail X-X in FIG. 8.
Figure 9:
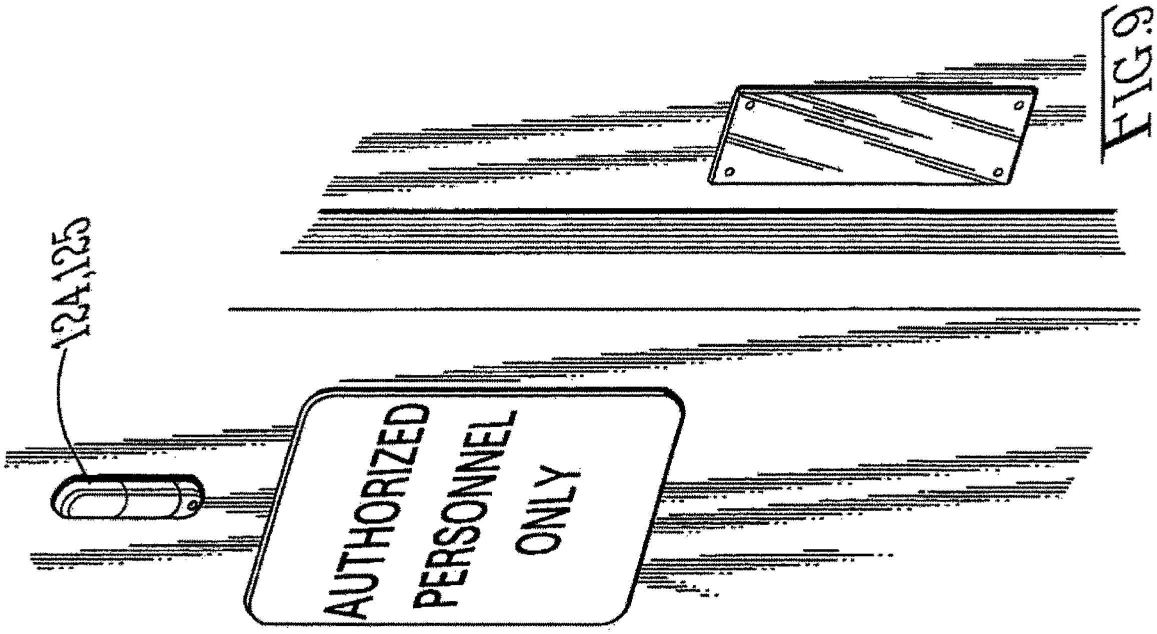
FIG. 9 is an enlarged-scale perspective view of detail IX-IX in FIG. 8.
Figure 12:
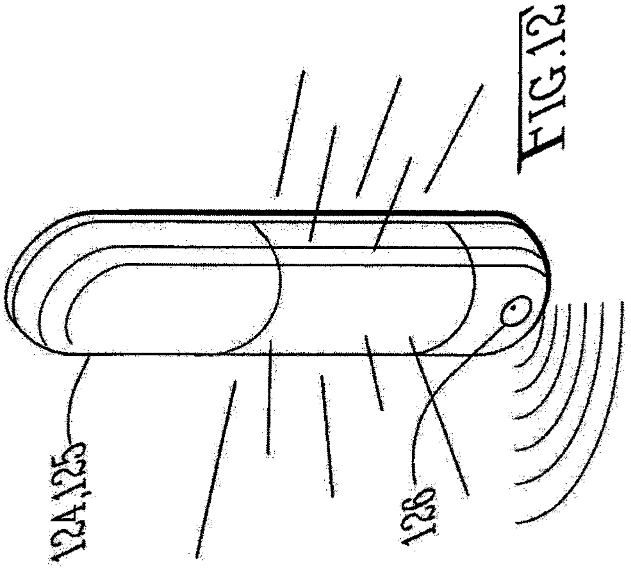
FIG. 12 is a perspective view comparable to FIG. 11 except showing the alarm light glowing or flashing yellow.

FIG. 9 is an enlarged-scale detail view of detail IX-IX in FIG. 8. It shows a combination alarm light 125 and sensor/reader 124 in accordance with the invention mounted to the wall above the signage. FIG. 10 is an enlarged-scale detail view of detail X-X in FIG. 8. FIG. 11 is a perspective view of a combination alarm light and sensor/reader 124-125 in accordance with the invention, glowing or flashing red. There moreover is an alarm siren 126 wherein the alarm options include both visual and aural alarms. FIG. 12 is a perspective view comparable to FIG. 11 except showing the alarm light 125 glowing or flashing yellow.

Figure 13:
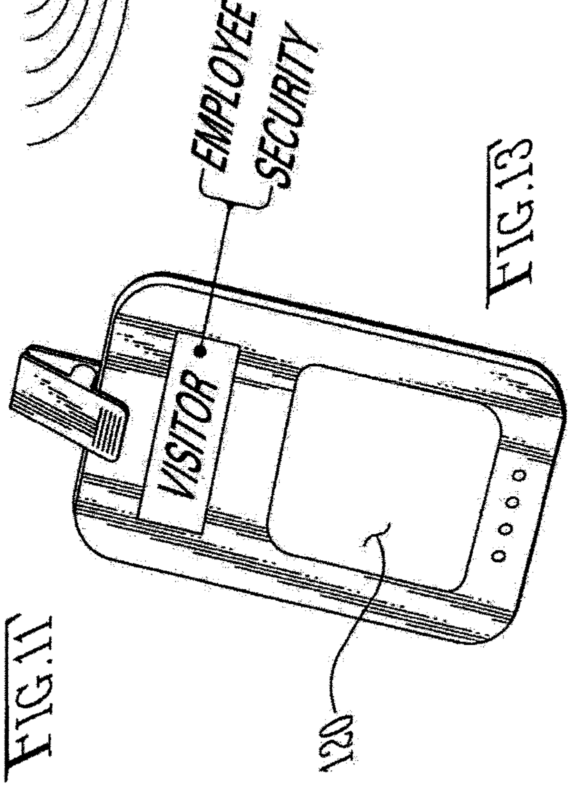
FIG. 13 is a perspective view of a transponder for use in the traffic signal system in accordance with the invention.

FIG. 13 is a perspective view of a transponder 120 for use in the traffic signal system 100 in accordance with the invention, comprising by way of non-limiting example an RFID tag (radio frequency identification tag).

Figure 14:
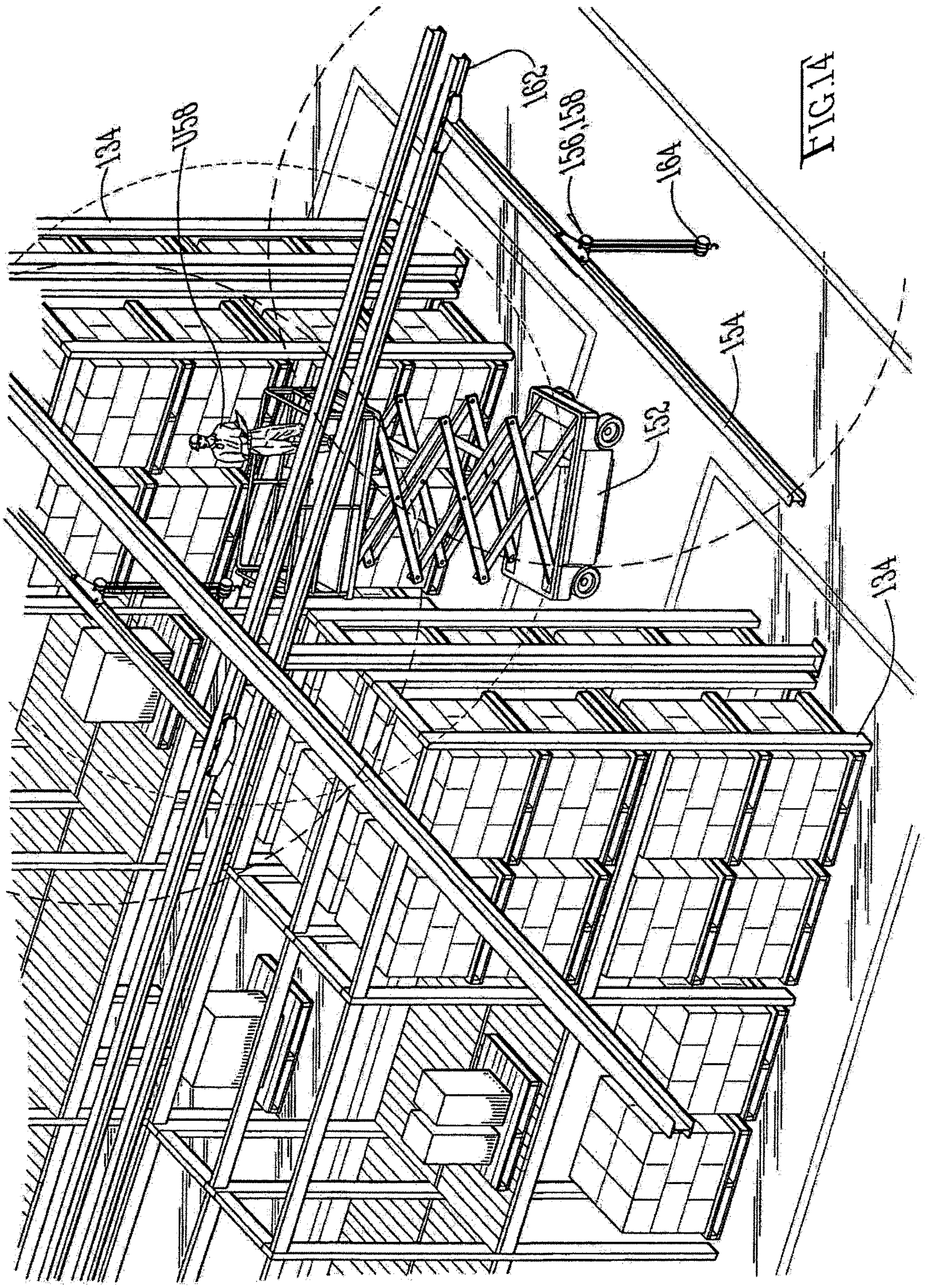
FIG. 14 is a perspective view comparable to FIG. 4 except showing a scissors lift lifting a worker on an aerial work platform and into potential harm's way from the gantry of an overhead crane/hoist.

FIG. 14 is a perspective view comparable to FIG. 4 except showing a scissors lift 152 lifting a worker U58 on an aerial work platform and into potential harm's way from the gantry 154 of an overhead crane/hoist 156. An overhead crane hoist 156 suspended from a traversing shuttle carriage 158 might comprise a gantry beam 154 running between spaced rails 162, the shuttle carriage 158 traversing the gantry beam 154, and terminal hoist tackle 164 suspended beneath the shuttle carriage 162. All might be tagged with transponders 120. The gantry 154 and/or carriage 162 might also be mounted with a alarm light/sensor-reader 124-125 as shown in FIGS. 11 and 12. The crane hoist 156 might be at the control of a different worker (not shown) who may have his or her own blind spots.

Figure 15:
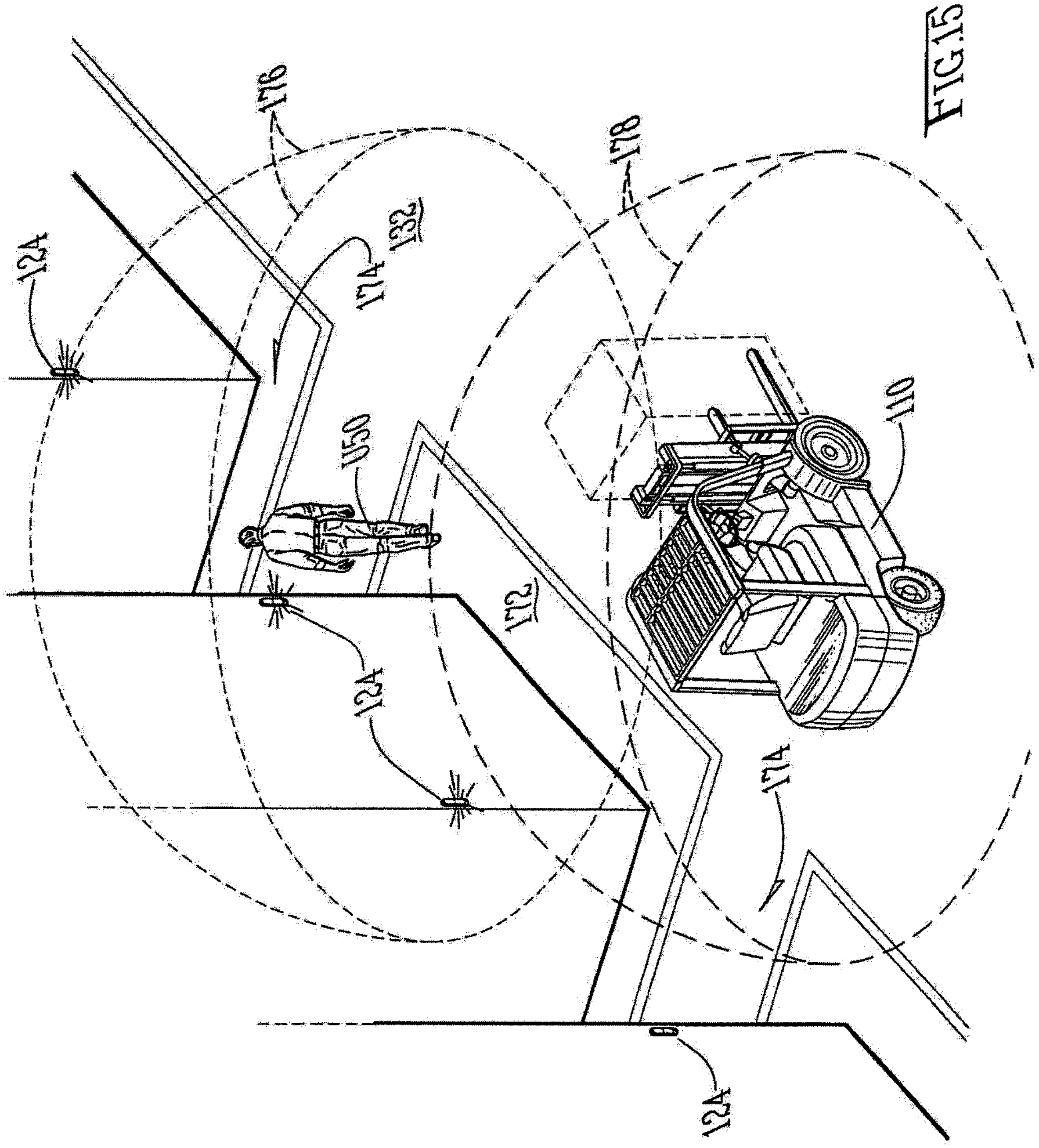
FIG. 15 is a perspective view comparable to FIG. 4 except showing a pedestrian walking in pedestrian lanes and about to walk into a rack bay as well as showing a fork lift in an aisle thoroughfare outside a series of rack bays which is about to overtake the pedestrian from behind.

FIG. 15 is a perspective view comparable to FIG. 4 except showing a pedestrian U50 walking in pedestrian lanes 172 and about to walk into a rack bay 174 as well as showing a fork lift 110 in an aisle thoroughfare 132 outside a series of rack bays 174 which is about to overtake the pedestrian U50 from behind. The fork lift driver might see the pedestrian U50, but the pedestrian U50 has his back to the fork lift 110. The pedestrian U50 is within range 176 of causing three corner-mounted alarm lights/sensor-readers 124-25 to glow or flash yellow.

Figure 16:
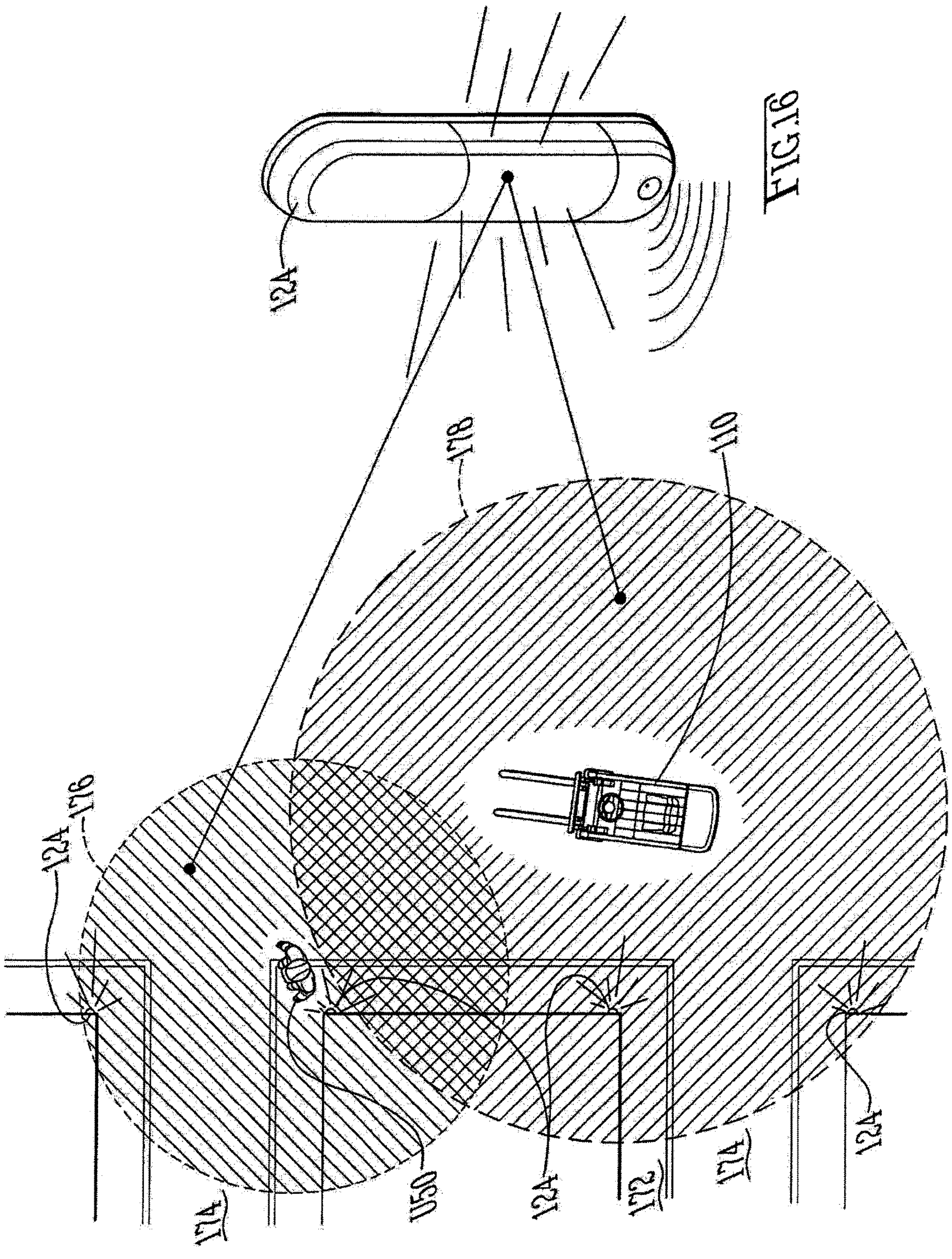
FIG. 16 is a plan view of FIG. 15 except showing all four lights glowing or flashing yellow.

FIG. 16 is a plan view of FIG. 15 except that the pedestrian U50 and fork lift 110 are respectively within range 176 and 178, respectively, to cause all four alarm lights 124 (with sensor-readers) to glow or flash yellow, but none red.

Figure 17:
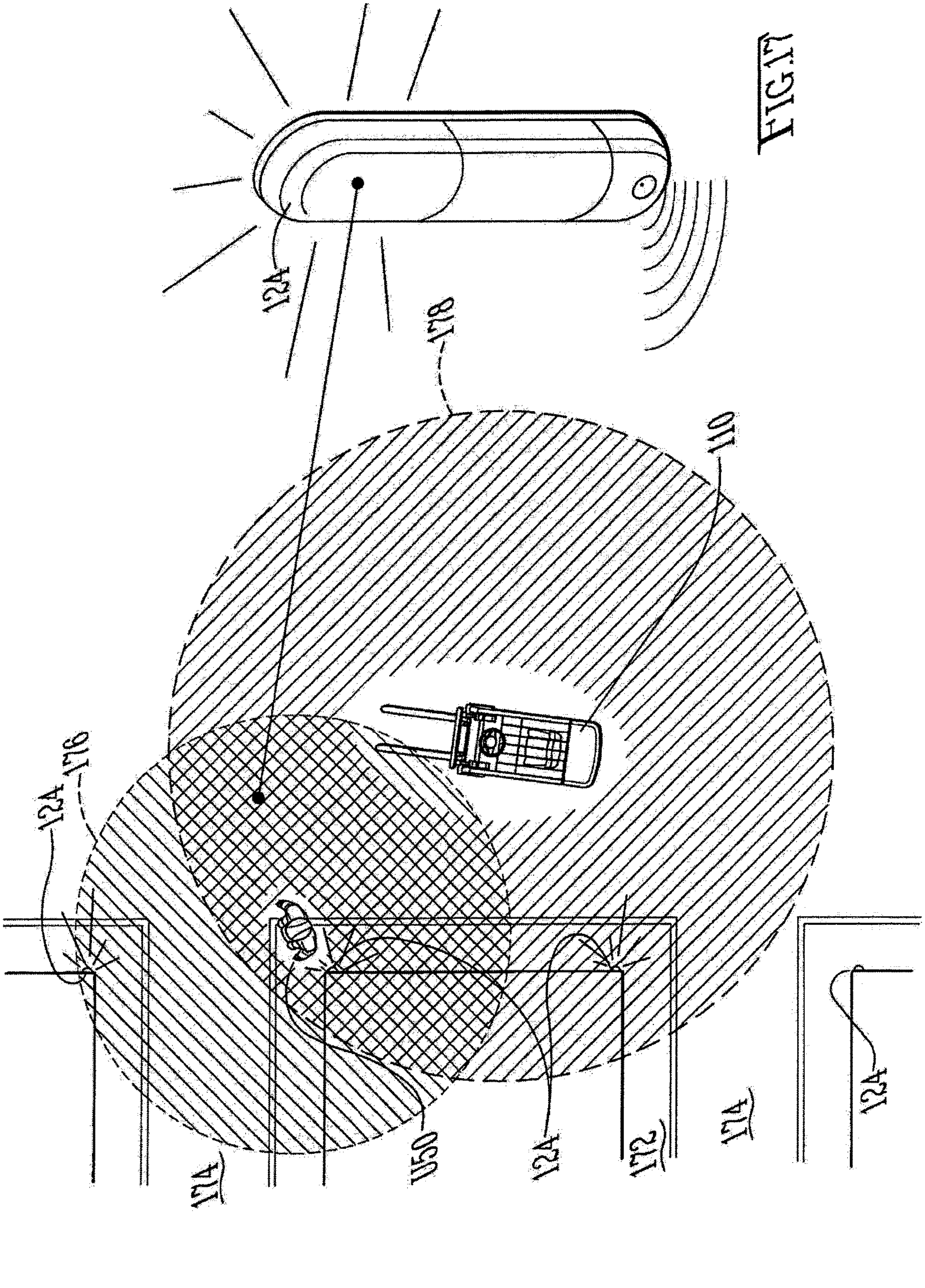
FIG. 17 is a plan view comparable to FIG. 16 except showing the fork lift moved closer to the pedestrian as well as showing the middle light glowing or flashing red.

FIG. 17 finally shows that the fork lift 110 has overtaken the pedestrian U50 to the point where the alarm light 124 closest to the pedestrian U50 is glowing or flashing red, thus giving the pedestrian U50 an evident warning of an overtaking fork lift 110.

FIGS. 18 through 21 show an alternate aspect of the invention, namely a light bar 112 mounted in the ceiling 182 of the helm of the fork lift 110.

Figure 18:
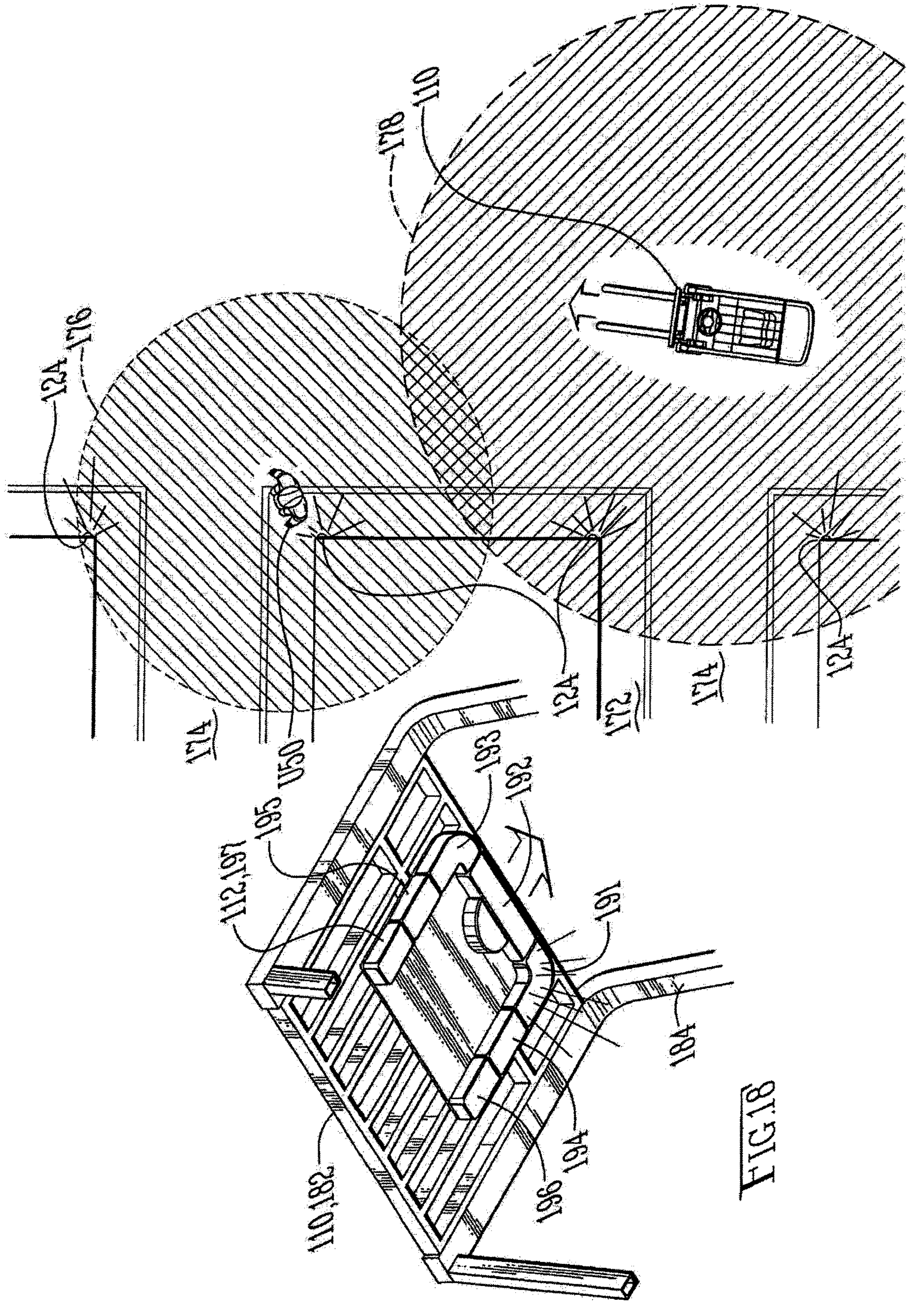
FIG. 18 is a split view comprising bottom perspective view of the ceiling of the fork lift cage on the left side of the view, and on the right side of the view, a top plan view of the fork lift and pedestrian as about shown in FIG. 16.

FIG. 18 is a split view comprising bottom perspective view of the ceiling 182 of the fork lift cage on the left side of the view, and on the right side of the view, a top plan view of the fork lift 110 and pedestrian U50 as about shown in FIG. 16. The light bar 112 comprises an open frame (eg., parallelogram) with seven or eight sections (seven such sections 191-197 are shown). Preferably there is a section at each corner 191 and 192, one section 193 straight forward, two other sections to the left and right (ie, 194 and 195 respectively, and, 196 and 197 respectively), and an eighth section straight behind the head of the driver (this is not shown).

FIG. 18 shows that the section on the left-front corner section 191 is glowing or flashing above the head of the driver, to warn him or her of the pedestrian U50 detected at 11 o'clock.

Figure 19:
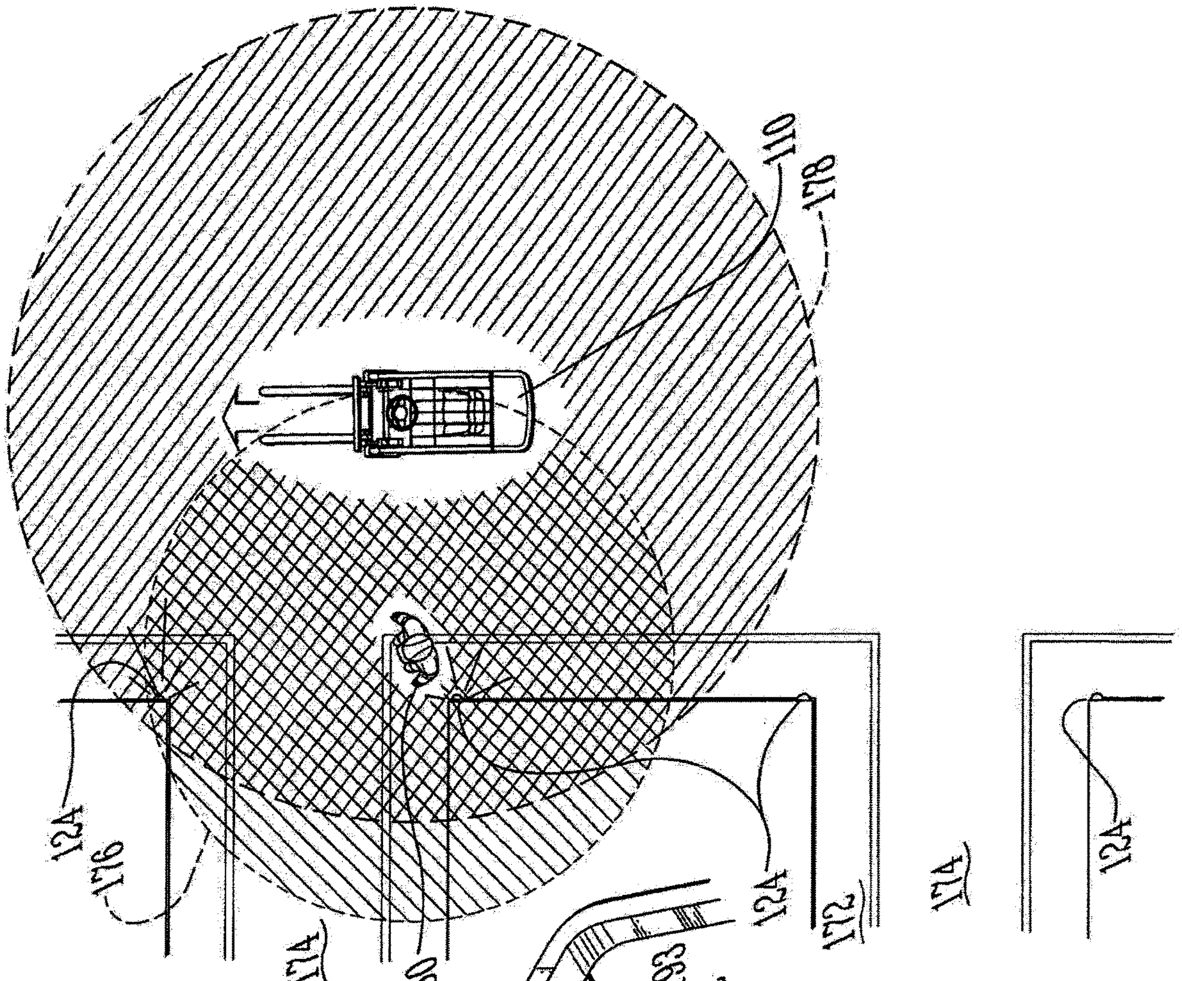
FIG. 19 is a split view comparable to FIG. 18 except showing how the light bar in the ceiling of the fork lift cage reacts to the pedestrian being detected inside the perimeter of the sensor of the fork lift.
Figure 19:
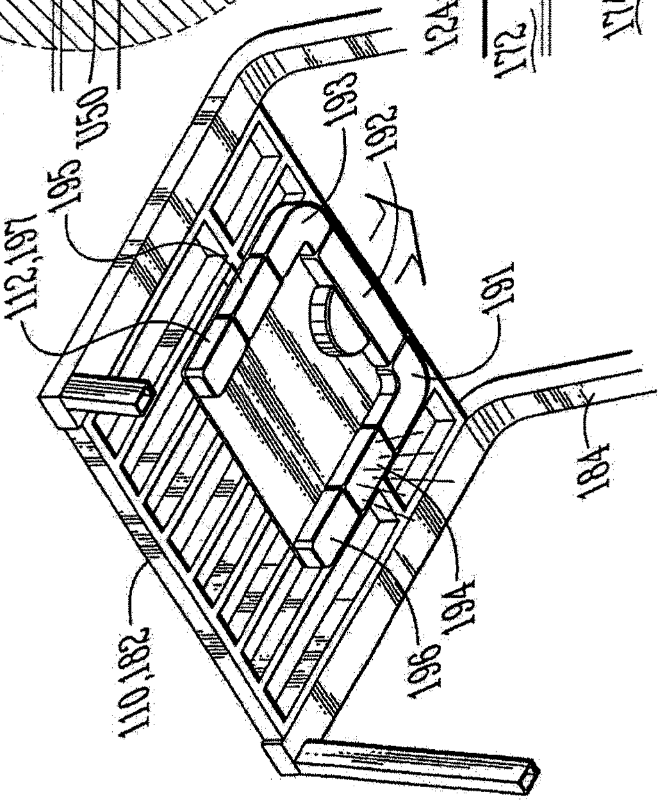

FIG. 19 shows that the section 194 of the light bar 112 on the left side is glowing or flashing because the direction-locating ability of the onboard sensor-reader (ie., 124, not shown) now has correctly determined that the pedestrian U50 lies to the left side of the fork lift 110. The light bar 112 provides a visualization indication accordingly.

Figure 20:
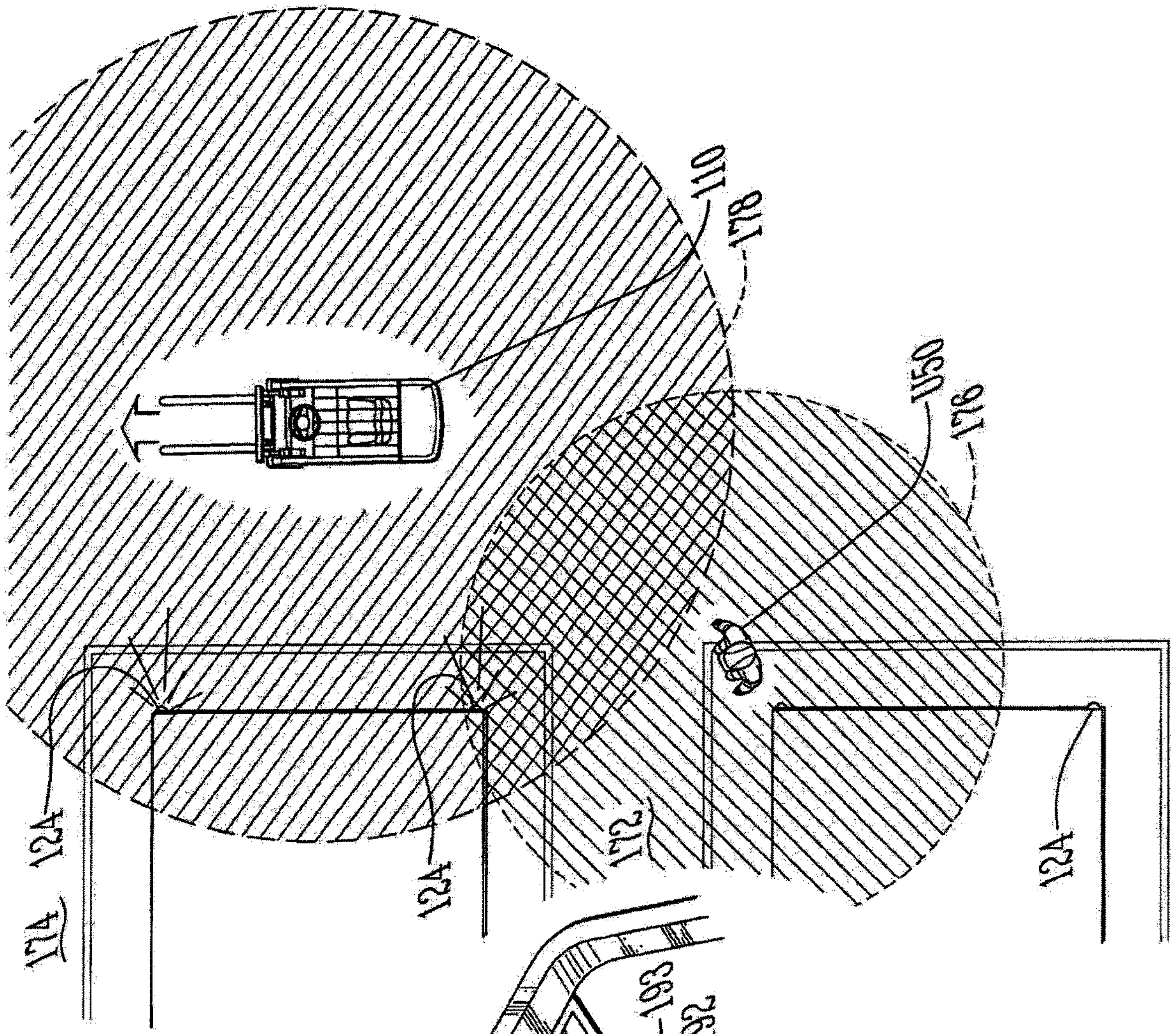
FIG. 20 is a split view comparable to FIG. 19 except showing the reaction of the light bar in the ceiling of the fork lift cage to the pedestrian being left behind.
Figure 20:
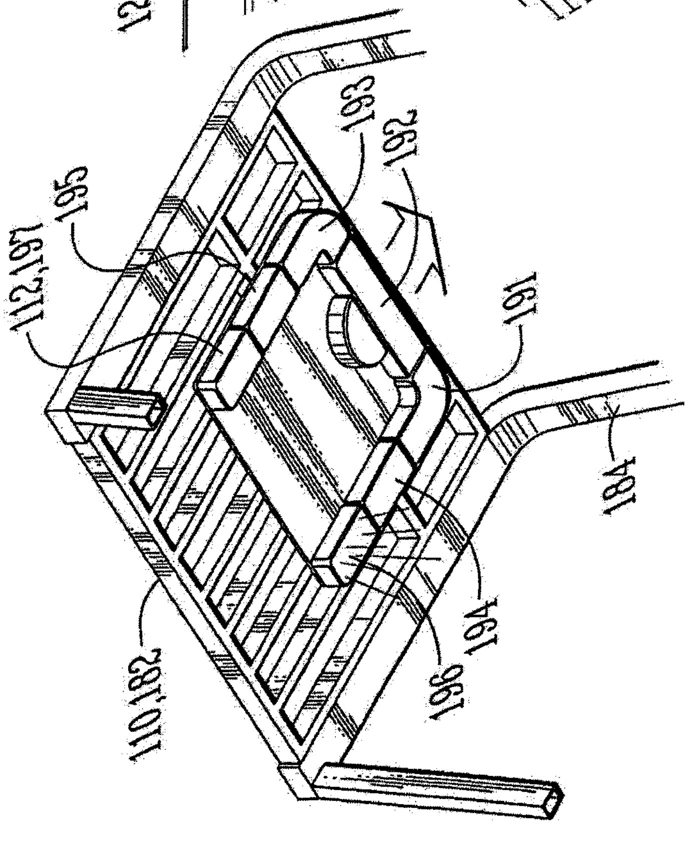

FIG. 20 shows the reaction of the light bar 112 in the ceiling 182 of the fork lift cage to the pedestrian U50 being left behind. The left-rear section 196 is glowing or flashing.

Figure 21:
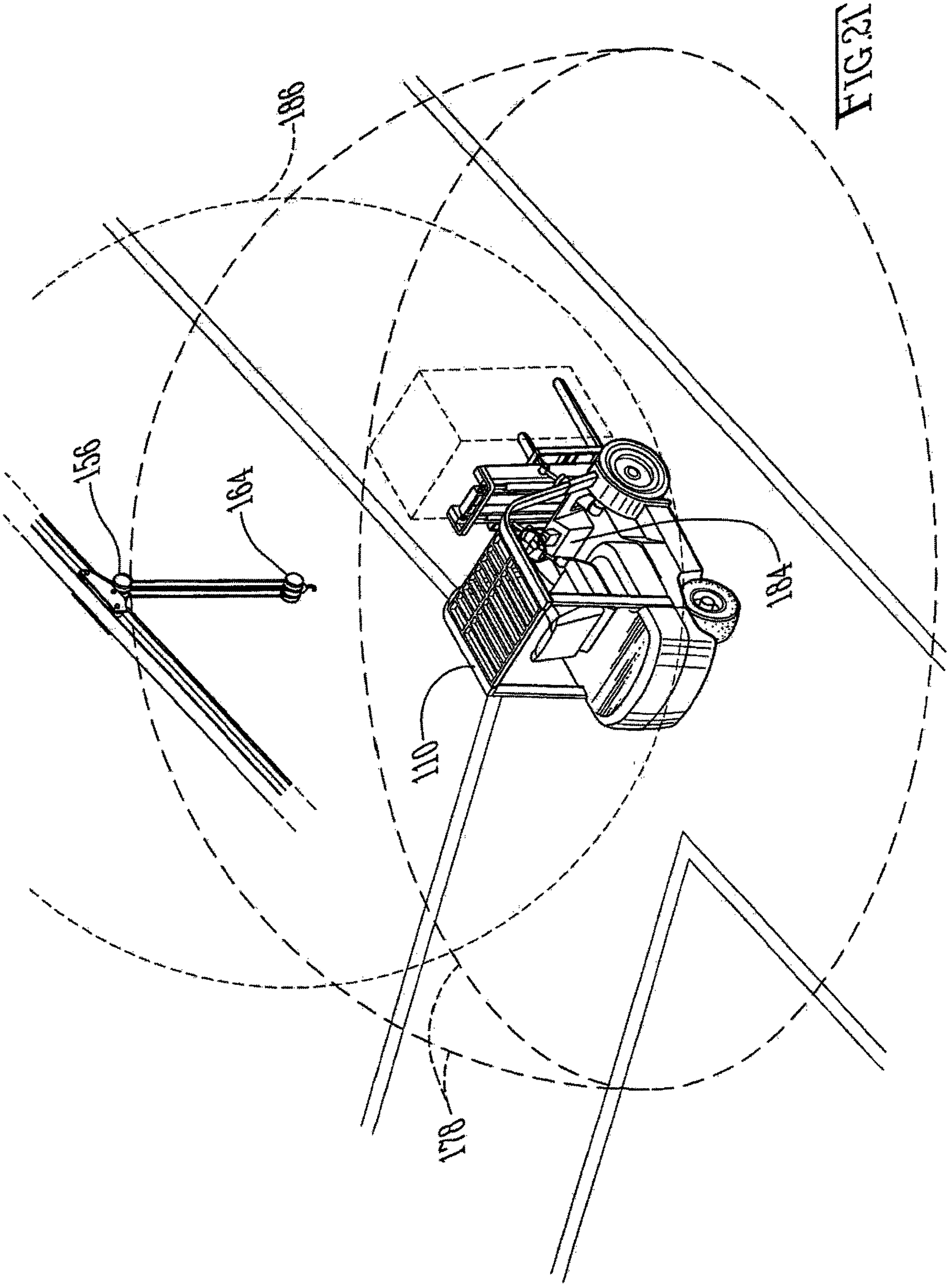
FIG. 21 is a perspective view comparable to FIG. 4 except showing an overhead crane/hoist.
Figure 22:
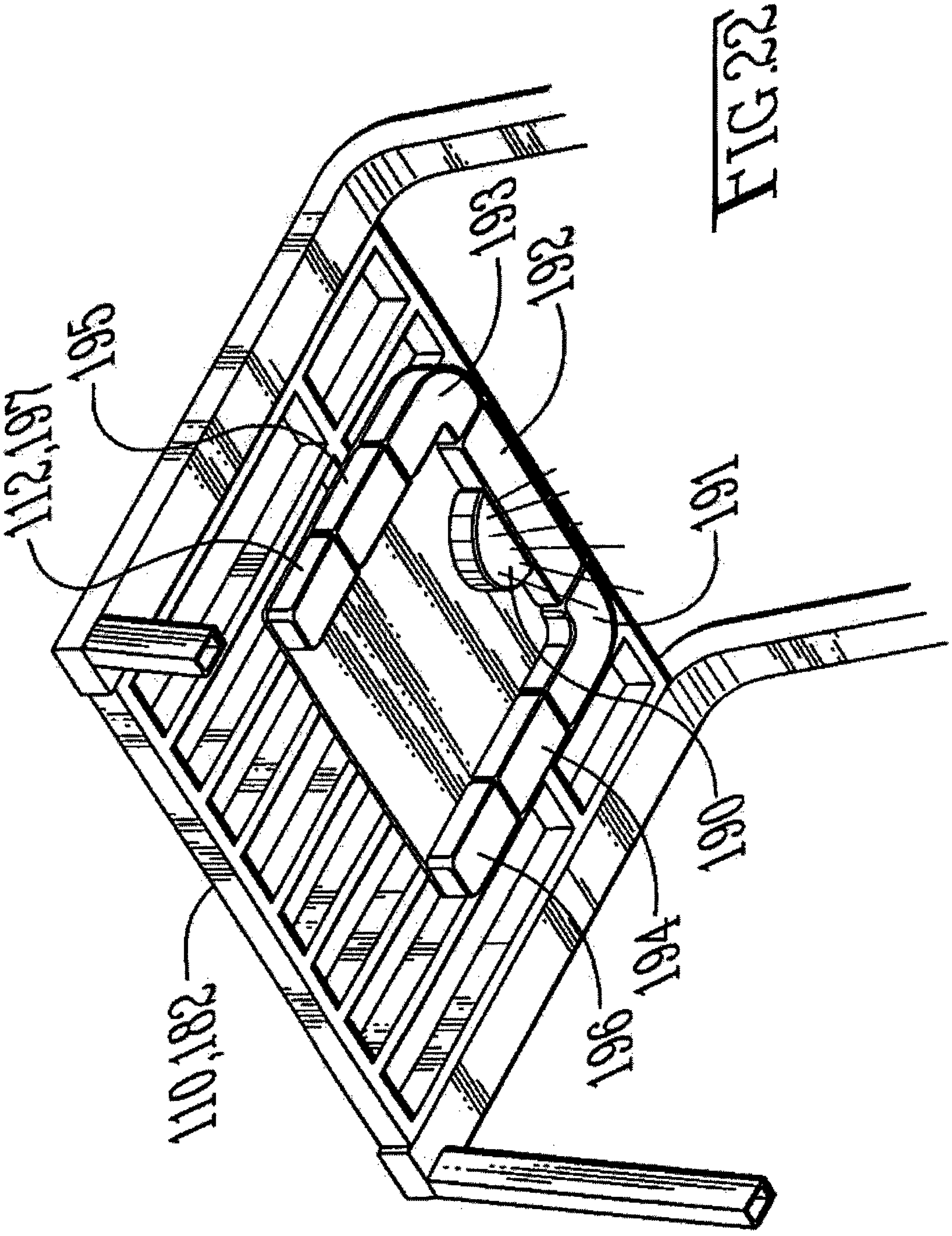
FIG. 22 is a bottom perspective view of the ceiling of the fork lift cage comparable to what's shown on the right side of the view in FIG. 18, except showing how the light bar reacts to the detection of the overhead crane/hoist.

FIG. 21 is a perspective view comparable to FIG. 4 except showing an overhead crane/hoist 156. The sphere 186 indicated in dashed lines represents the detectable range of a transponder 120 (not shown) attached to the terminal tackle 164 of the overhead crane/hoist 156. FIG. 22 is another bottom perspective view of the ceiling 178 of the fork lift cage comparable to what's shown on the left side of the view in FIG. 18, except showing how the light bar 112 reacts to the detection of the transponder 120 (not shown) attached to the terminal tackle 164 of the overhead crane/hoist 156. There is a center interior light 190 that is not part of the lightbar frame 112 proper which glows or flashes to provide warning of the overhead hazard.

It is an aspect of the invention to keep workers apprised of the hazards in an environment like this—not only in the changing environment in 360° on the ground plane—but also in three dimensions (3D) in not only the overhead space but also hazards where the ground plane has ledges or drop offs as well.

1. UWB and Dynamic Safety Protocols Among Parties in Traffic.

Further aspects of the invention relate to integrity checks of mobile and stationary warning signal system for congested trafficways and, more particularly, to Ultra Wideband (UWB) short-range, wireless communication protocol and dynamic safety thresholds among parties in congested trafficways.

That is, one aspect involves badge separation from worker pedestrian—as by use of accelerometer, UWB and lack of movement observations over time—which is relevant to protect workers if a badge became separated from workers. The detection of an event comprising the drop of a badge causes the safety system to identify and warn if a badge is dropped. The safety system might also submit warning across the system for pedestrian safety verification or alert for lack of movement observations over time.

To turn to another aspect, it involves dynamic adaption of safety thresholds to protect against accidents between vehicles and workers and vehicles and vehicles, depending on such factors as:—

- Depending on speed;
- Depending on load size-sensor and signaling automatically adapting for changes in carried load sizes. Adjusting the signal warning for current load clearance distance (beyond an unloaded forklift) and load required stopping distance for the calculated height, width, depth and weight of the current load;
- Depending on driver safety record and experience;
- Depending on driver or plant accident or near miss data;
- Depending on forward, backward or turning;
- Depending on equipment rated capacity; and/or
- Depending on location within plant or facility.

2. Safety Protocols More Broadly Among Parties in Traffic.

The following comprises a summary, regardless if cumulative or redundant with any of the above or within any of what follows, of various aspect and objects of the invention.

A Traffic Signal System for congested trafficways in a workspace populated by a plurality of pedestrians and a plurality of vehicle-driver driven land vehicles.

A traffic signal system method for congested trafficways in a workspace populated by a pedestrians, a vehicle-driver driven land vehicles, and other hazards.

A traffic signal system for congested trafficways in a workspace populated by a plurality of pedestrians and a plurality of vehicle-driver driven land vehicles and at least one mobile ceiling hung piece of equipment.

A traffic signal method for congested trafficways in a workspace populated by a pedestrians, a vehicle-driver driven land vehicles, and other hazards.

A method utilizing cameras as a vision smart sensors in a traffic signal system for any combination of heat transfer, motion, facial recognition or recognition of other objects for detection and/or identification of objects including people or machinery.

A method of utilizing camera technology to provide wirelessly transmitted images to vehicles so operators of moving motor vehicles can avoid hazards or collisions in an area.

A method utilizing recorded data from cameras and sensors including movement to allow for incident recording and review, traffic flow analysis, security analysis and other uses.

A system interconnecting multiple sensors and signaling devices across multiple paths to provide identification, safety, range and or location performance; wherein said interconnected sensors can also adjust the location area in a precise way for normal or irregular shaped areas being protected or authorized for certain people or equipment.

Detection of ALL entities in area and calculating the prediction of there relative movement within area—based on their specific movement capabilities and traffic patterns, current driver records.

Intercommunication of sensors within area to increase/improve data for collision protection calculation including sensor information from non-line of sight or adjoining areas Only signaling alerts when relative prediction to intersect-based on direction and speed of movement and ability to intersect (ie., assuming the absence of physical barriers).

Sensor fusion of multiple technologies to provide dynamic calculation of intersection prediction—with sensor redundancy—UWB, Radar, Camera, Laser—using mesh or other communication methods.

Limiting alerts when there are physical barriers to block movement before intersection—like barrier walls, rails or racks. Only alerts when collision predicted. Could be on parallel pathways and only signal when one of the moving objects turns to cross pathways at a speed and distance predicted to intersect. System predicts collision if speed and pathway continues. But if pathway is altered before system controlled alert range (for each detected entity) then no alert signaled. If physical barrier blocking intersection then no alert signal.

System health checks and alerts to monitoring personnel to keep system fully active and responsive including battery health, update status, badge or transponder droppage or separation from assigned entity, connectivity to system, signal strength.

Detection of all entities in system (with transponder) AND Detection (using motion, other non-transponder detection methods) of entities NOT in system. For stand-alone contractor and temporary safety system that detects and alerts for pedestrians or moving vehicles that move into safety designated boundaries of restricted barricaded area or general range of system controlled vehicle.

Detection of moving or stationary objects NOT in system, identification of type or classification of detected object based on programmed identity markers, using system information on movement patterns of the identified classification, using sensor detected measurements of object size, speed, direction of travel (if moving) to calculate system response (alert signaled, avoidance if automated vehicle, etc).

Multiple data collection points and health check points stationed within area that will increase speed and integrity of data collection as the transponders pass through check point, will provide checkpoint references for entity/transponder location and movements, and provide updated monitoring of entity/transponder health status. System may define number and location of data collection points based on collection and status check frequency requirements Traffic system that utilizes information detected (in area) to predict intersection of pedestrians and/or vehicle-driver driven vehicles and other hazards kept to the prediction.

Traffic system that utilizes information detected (in area) to predict intersection of pedestrians and/or remotely controlled vehicles or other hazards.

Traffic system that utilizes information detected (in area) to predict intersection of pedestrians and/or vehicle-driver or remote driven vehicles and other hazards (and signals system defined alerts).

Traffic system that activates system controlled and defined alerts or signals that may be differentiated by identity of entity or type of entity detected.

System activates system controlled and defined alerts or signals that may be differentiated by identity of entity detected for any combination of entity characteristics including: entity type (pedestrian, vehicle type, remote controlled or driver driven or other hazards); entity movement capabilities including speed, direction, turning radius, stopping distance (based on entity factory specifications and or historical data collected on entity or entity type); entity location; system defined requirements for entity or entity type for detected location of entity; entity or entity type authorization to area; detected direction or speed of movement of detected entity including moving forward, backward, turning, or stopping; entity or entity type rated load capacity; or entity actual load capacity.

(Traffic) system that activates system controlled and defined alerts or signals that may be differentiated by identity of entities or type of entities for predicted intersection of two or more detected entities.

Traffic system that utilizes information detected to predict intersection of pedestrians and/or vehicle-driver or remote driven vehicles or other hazards and signals (system defined) alerts when collisions are projected based on data detected on entity/transponders within area including travel pathway, speed of movement, angle of or direction, angle of projection, size or location of stationary objects or pathways barriers.

(System defined) a qualification that may not be necessary. See also the inclusion below on using data collected from multiple technology methods for detection of barriers that block the projected pathway and would thereby be included in the intersection prediction calculation. With a pathway barrier the signal would not be alerted to avoid false negatives that lead to signal alerts complacency.

(Traffic) system that utilizes information detected to predict intersection of pedestrians and/or vehicle-driver or remote operated vehicles or other hazards, and signals (system defined) alerts when collisions are projected based on identification of intersecting entities and the system information regarding the entities detected including automated or robotic operated hazards.

System information by entity including:

Pedestrian or moving vehicle,

Pedestrian's authorized area,

Vehicle-driver safety record and experience,

Vehicle-driver authorization to operate vehicle or equipment,

Pedestrian or Vehicle type authorized in area by location or designated times,

Vehicle specified size and rated load capacity, and/or

Vehicle information calibrated to actual load size and load projection beyond vehicle specified size.

System detects Vehicle-driver identity being paired with equipment and will limit equipment operation to system designated Vehicle-drivers authorized to operate the specific equipment or equipment type.

System controlled equipment operation based on qualifications of detected driver paired with equipment—including Pedestrians training, driver safety records and experience.

System includes in the prediction calculation and alert signal responses based on the identified Vehicle-Drivers safety record, driving experience rating and recorded movement patterns.

Traffic system that utilizes information on detected identities to identify, track, record operation or location or movement and signal system controllable alerts or information to pedestrians, or vehicle drivers, or monitoring personnel based on detected identity.

Sensor fusion of multiple technologies and multiple sensors, either on vehicle or within detection range of vehicle, to calculate the actual load size, load projection or load constraints, including movement or transfer of load, carried by Vehicle. This is valued because the actual load span can vary widely and using the vehicle size is too narrow and using the vehicle capacity is too wide a range for the level of prediction of collision and signaling ONLY when collision is imminent—especially in condensed environments.

Also included detecting of movement or transfer of load (such as liquids) because it would improve/impact prediction calculation and signal distance.

Detection system that utilizes information from multiple detection devices or methods simultaneously to collect data for dynamic calculation to predict intersection of pedestrians and/or vehicle-driver or remote operated vehicles or other hazards.

Sensor fusion of multiple technologies to collect data for dynamic calculation of relative locations using collective derivatives and multi-derivative [1,2,3,4] analysis to predict intersection of pedestrian and/or vehicle-driver driven vehicle or remote operated vehicle or other hazards.

Sensor fusion of multiple technologies to collect data for dynamic calculation of relative locations using collective derivatives and multi-derivative [1,2,3,4] analysis to predict intersection of any combination or multiples of pedestrians and/or vehicle-driver driven vehicles or remote operated vehicles or other hazards.

Sensor fusion of multiple technologies to collect data of relative locations of stationary objects and pathway barriers restricting intersection of any combination or multiples of pedestrians and/or vehicle-driver driven vehicles or remote operated vehicles for dynamic calculation of relative locations to predict intersection of any combination or multiples of pedestrians and/or vehicle-driver driven vehicles or remote operated vehicles or other hazards. Multiple technology methods and sensors including laser, cameras or radar to detect physical barriers that will block or change the entity/transponder projected pathway before intersecting with other entity/transponders detected within system calculated range of projected intersection Inclusion using data collected from multiple technology methods (laser, camera, radar) for detection of barriers that block the projected pathway that need to be included in the intersection prediction calculation. With a pathway barrier the signal would not be alerted to avoid false negatives that lead to signal alert complacency.

Detection system that utilizes information from single or a plurality of detection devices or methods to monitor condition or activity of entity assigned badge or transponder.

Each entity is assigned a badge/transponder with information applicable to the specific entity including but not limited to any combination of the following:

System information by entity including:

Entity type (Pedestrian, driver driven vehicle, remote driven vehicle, overhead hazard, other hazards), Entity authorized area, and/or Entity authorization to operate vehicle or equipment types, and then System controlled pairing of authorized driver to authorized equipment:

Entity safety record and experience,

Entity vehicle authorized in area,

Entity vehicle factory specified capabilities including movement, size and rated load capacity, Entity Vehicle actual capability based on historical information calibrated to actual load size and projection beyond vehicle specified size, Entity Vehicle current information calibrated to actual load size and load projection beyond vehicle specified size, and/or Specifications or limits within area System detection of any combination of conditions including:

If badge/transponder was dropped,

If badge/transponder has low battery,

If badge/transponder is not responding to system,

If badge/transponder needs software update

If badge/transponder is stationary beyond system defined time allowances,

If badge/transponder has not passed through system checkpoints or has not uploaded system data on badge/transponder activity within system defined guidelines, Location of badge/transponder within area:

If badge/transponder was in authorized or assigned area,

If badge/transponder was "paired" in movement to authorized or unauthorized driver driven vehicle.

System detected badge/transponder sends system defined alerts to assigned entity or monitoring personnel and collects all detection data collected for assigned entity badge/transponder:

Based on detection conditions listed above.

Sensor fusion of a plurality of sensors to collect data for dynamic calculation of relative locations using collective derivatives and multi-derivative [1,2,3,4] analysis to predict intersection of pedestrian and/or vehicle-driver driven vehicle or remote operated vehicle or other hazards.

Traffic or detection system utilizing sensor fusion of a plurality of sensors to collect data for dynamic calculation of relative locations using collective derivatives and multi-derivative [1,2,3,4] analysis to predict intersection of pedestrian and/or vehicle-driver driven vehicle or remote operated vehicle or other hazards.

System that utilizes information collected from a plurality of sensors in a plurality of locations to dynamically calculate the relative locations and movement to predict intersection of pedestrian and/or vehicle-driver driven vehicle or remote operated vehicle or other hazards.

System that utilizes information collected from a plurality of sensors in a plurality of locations to dynamically calculate the relative locations and movement to predict intersection of pedestrian and/or vehicle-driver driven vehicle or remote operated vehicle or other hazards and signal alert to entity/transponders predicted to intersect.

Regarding Blind Spot elimination, assist with blind corners and prediction redundancy.

(Traffic system utilizing) sensor fusion of a plurality of sensors in a plurality of locations to collect data for dynamic calculation of relative locations and movement to predict intersection of pedestrian and/or vehicle-driver driven vehicle or remote operated vehicle or other hazards. Include all sensor information including sensors in area and adjoining, non line of sight areas, to predict collisions. Also an important distinction is the calculation and prediction is at the local (exp. forklift) transponder level for more accuracy in prediction and fewer false negative as a result of having to allow for latency in system communication which would require an increasing the separation distance when an alert is signaled.

(Traffic system utilizing) sensor fusion of a plurality of sensors in a plurality of locations to collect data for dynamic calculation of relative locations and movement to predict intersection of pedestrian and/or vehicle-driver driven vehicle or remote operated vehicle or other hazards and signal alert to entity/transponders predicted to intersect.

Sensors communicate to centralized system and local transponder entities for calculation.

Sensors detect relative location and movement of all entity/transponders in area and communicates the data to other entity/transponders in area for the local entity or transponder calculation and prediction of intersection with other entity/transponders in area.

Plurality of sensors communicate detected information directly to entity transponders detected within system defined range to provide plurality of detection information over rapidly changing location.

Plurality of sensors located within detected entity range communicate detection information directly to entity transponders detected within system defined range to provide plurality of detection information over rapidly changing location.

Plurality of sensors communicate detected information directly to entity transponders detected within system defined range to provide plurality of detection information over rapidly changing location for local entity/transponder calculation of relative location and movements of entity/transponders within range to predict intersection of local entity/transponder with other entity/transponder and signal alert for predicted collision.

Plurality of sensor locations and technologies including:

- Stationary sensors installed within area, including areas beyond line of sight of local entity, that detect, collect, and transmit information on (movement of) entities or transponders to other entity transponders within specified range.
- Sensors on a plurality of other moving entities/transponders within area that detect, collect, and transmit sensor information to other entities or transponders, including entities/transponders beyond line of sight of local entity/transponder, within specified range.
- Sensor and transponder apparatus contained in strands or mesh or other woven material utilized to produce wearable detection and alert system.

Wearable detection and alert system that does not interfere with movement or operations of pedestrian or driver. Wearable detection and alert system includes full functionality of detection and alert system including: plurality of sensors, transponder, system, battery, alert signaling.

Sensor and transponder apparatus contained in strands or mesh or other woven material utilized to produce wearable system.

System that utilizes information collected from a plurality of sensors in a plurality of locations to dynamically calculate the relative locations and movement to predict intersection of pedestrian and/or vehicle-driver driven vehicle or remote operated vehicle or other hazards and signal alert to entity/transponders predicted to intersect.

System that utilizes signal alerts of predicted intersection to activate cameras and sensors within range of predicted intersection for data collection.

System data for predicted intersection collected for review and analysis of near-miss incidents or collision incidents.

A method utilizing recorded data from cameras and sensors including movement to allow for incident recording and review, traffic flow analysis, security analysis and other uses.

Cameras activated and sensor information collected at point of prediction and deactivated when prediction has passed.

System that utilizes signal alerts of intersection or collision to activate cameras and sensors within range of predicted intersection for data collection.

Cameras activated and sensor information collected at point of prediction and remain activated until system authorized personnel deactivate.

When collision is predicted and signaled—cameras are activated and camera and sensor information is collected and transmitted to system logs with near miss information.

When a collision is predicted and occurs—cameras within range are activated and remain activated until deactivated by system or monitoring personnel to collect collision details and signal severity of alert.

Data collection include all sensor data for entities/transponders predicted to intersect.

Data collection include all sensor data for entities/transponders within system defined range of predicted intersection.

Camera recognition of stationary and moving objects for identification of system entity transponder and non system entity objects based on camera or sensor detected identity markers.

A system interconnecting multiple sensors and signaling devices across multiple paths to provide identification, safety, range and or location performance (wherein said interconnected sensors can also adjust the location area in a precise way for normal or irregular shaped areas being protected or authorized for certain people or equipment).

A system utilizing sensors or cameras for detection, recognition, classification and/or categorization or identification of stationary or moving objects:

- Detection of system entity/transponders, and/or
- Detection of non-system entity/transponders, moving objects with recognition of identity markers for categorization of detected objects movement capabilities or other system controlled responses.

System calculation of (system programmed) response to detected stationary and moving objects not connected to system entity transponders based on recognition and classification of detected object.

Detection of non-moving objects with recognition of identity markers for classification of barrier type, size, or system response including calculation of system entity/transponders predicted intersection.

A method of identification without a full system deployed or backbone system. Also expanding application outside of warehouse or industrial manufacturing. Could be a quarry where the object is a unauthorized visitor—the system will identify the visitor as pedestrian by programmed identity markers of size and movement. Could also be a field where automated vehicles are picking up hay bales and stacking and a cow or a person on a tractor comes up. The system would identify the cow or the tractor and avoid collision (or any other programmed response).

The two just above are different because detection and classification of non transponder carrying objects makes it more robust and adaptable. Will require more work for programming of identity markers and more risk if incorrect—but the tolerances could be widened if a non-system transponder detection. Also dropped "traffic system" to broaden application.

Traffic system that utilizes information detected to predict intersection of pedestrians and/or vehicle-driver or remote driven vehicles or other hazards and signals (system defined)

alerts when collisions are projected based on data detected on entity/transponders including travel pathway, speed of movement, angle of or direction, angle of projection, stationary objects or pathways barriers.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A traffic signal method for a traffic signal system over congested trafficways in a workspace populated by pedestrians, vehicle-driver driven land vehicles, remote-controlled land vehicles (RCLV's) and other hazards; said traffic signal method also providing for the utilization recorded data from cameras and sensors including movement to allow for RCLV control signal analysis, incident recording and review, traffic flow analysis, security analysis and other uses; said traffic signal method comprising the steps of:

providing at least one transponder for wearing by at least one pedestrian and indicating each such wearer's status equates at least to being a pedestrian;

providing at least one transponder for wearing by vehicle-drivers and indicating each such wearer's status equates at least to being a vehicle-driver;

providing at least one transponder for wearing by vehicle-driver driven land vehicles and indicating each such wearer's status equates at least to being a vehicle-driver driven land vehicle;

providing at least one transponder for wearing by remote-controlled land vehicles (RCLV's) and indicating each such wearer's status equates at least to being a remote controlled land vehicle;

providing at least one camera mounted at a position within the workspace to provide trafficway monitoring within at least selected areas of the workspace;

providing at least one stationary traffic light mounted at a position within the workspace to provide traffic signaling in connection with designated areas of concern;

providing at least one stationary sensor/reader of transponder output mounted at positions within the workspace to provide trafficway detection within at least some areas of the workspace; and transferring transmitted camera images and Sensor information, including movement of Transponders, throughout the workspace to connected data storage devices whereby to allow for RCLV control signal analysis, incident recording and review, traffic flow analysis, security purposes or other uses.

2. The method of claim 1, further comprising the step(s) of:

analyzing the trafficway data transferred to the connected data storage devices for RCLV control signal analysis.

3. The method of claim 1, further comprising the step(s) of:

analyzing the trafficway data transferred to the connected data storage devices for incident recording and review, traffic flow analysis, and security purposes.

4. The method of claim 1, further comprising the step(s) of:

providing at least one system health check position within the workspace to alert monitoring personnel to keep system fully active and responsive including battery health, update status, badge or transponder droppage or separation from assigned entity, connectivity to system, signal strength.

5. The method of claim 1, wherein:

the at least one sensor is any of surface mounted, pole mounted or installed in surfaces comprising any of floors, roads, right of ways or dock edges, or erected within exterior areas comprising anywhere in exterior, high traffic, industrial distribution areas with over-the-road truck and trailer traffic merging onto drive ways and dock access areas that also have other traffic including fork trucks, pedestrians, contractor trucks, visitor or facility worker vehicles, all within the protected space and assigned an appropriately classified Transponder identity.

6. The method of claim 5, further comprising the step(s) of:

monitoring traffic flow and potential hazards and signaling variably programmable warnings to approaching traffic using the classified Transponder identity that is approaching from an opposing traffic way.

7. The method of claim 5, further comprising the step(s) of:

detecting moving or stationary objects NOT in the system, identification of type or classification of detected object based on programmed identity markers, using system information on movement patterns of the identified classification, using sensor detected measurements of object size, speed, direction of travel (if moving) to calculate system response (alert signaled, avoidance if automated vehicle, etc).

8. A traffic signal method for a traffic signal system over congested trafficways in a workspace populated by pedestrians, land vehicles and other hazards; said traffic signal method also providing for the utilization recorded data from cameras and sensors including movement to allow for incident recording and review, traffic flow analysis, security analysis and other uses; said traffic signal method comprising the steps of:

providing at least one transponder for wearing by pedestrians and indicating each such wearer's status equates at least to being a pedestrian;

providing at least one transponder for wearing by vehicle-drivers and indicating each such wearer's status equates at least to being a vehicle-driver;

providing at least one transponder for wearing by land vehicles and indicating each such wearer's status equates at least to being a land vehicle;

providing at least one camera mounted at a position within the workspace to provide trafficway monitoring within at least selected areas of the workspace;

providing stationary traffic light mounted at a position within the workspace to provide traffic signaling in connection with designated areas of concern;

providing at least one sensor/reader of transponder output mounted at positions within the workspace to provide trafficway detection within at least some areas of the workspace; and transferring transmitted camera images and Sensor information, including movement of Transponders, throughout the workspace to connected data storage devices whereby to allow for incident recording and review, traffic flow analysis, security purposes or other uses.

9. The method of claim 8, further comprising the step(s) of:

analyzing the trafficway data transferred to the connected data storage devices for incident recording and review, traffic flow analysis, and security purposes.

10. The method of claim 8, further comprising the step(s) of:

providing at least one system health check position within the workspace to alert monitoring personnel to keep system fully active and responsive including battery health, update status, badge or transponder droppage or separation from assigned entity, connectivity to system, signal strength.

11. The method of claim 8, wherein:

the at least one sensor is any of surface mounted, pole mounted or installed in surfaces comprising any of floors, roads, right of ways or dock edges, or erected within exterior areas comprising anywhere in exterior, high traffic, industrial distribution areas with over-the-road truck and trailer traffic merging onto drive ways and dock access areas that also have other traffic including fork trucks, pedestrians, contractor trucks, visitor or facility worker vehicles, all within the protected space and assigned an appropriately classified Transponder identity.

12. The method of claim 11, further comprising the step(s) of:

monitoring traffic flow and potential hazards and signaling variably programmable warnings to approaching traffic using the classified Transponder identity that is approaching from an opposing traffic way.

13. The method of claim 11, further comprising the step(s) of:

detecting moving or stationary objects NOT in the system, identification of type or classification of detected object based on programmed identity markers, using system information on movement patterns of the identified classification, using sensor detected measurements of object size, speed, direction of travel (if moving) to calculate system response (alert signaled, avoidance if automated vehicle, etc).

14. A traffic signal method for a traffic signal system over congested trafficways in a workspace populated by pedestrians, motor vehicles and other hazards; said traffic signal method also providing for the utilization recorded data from cameras and sensors including movement to allow for incident recording and review, traffic flow analysis, security analysis and other uses; said traffic signal method comprising the steps of:

providing at least one transponder for wearing by pedestrians and assigning a classification therefore;

providing at least one transponder for wearing by vehicle-drivers and assigning a classification therefore;

providing at least one transponder for wearing by motor vehicles and assigning a classification therefore;

providing at least one transponder for other hazards and assigning a classification therefore;

providing at least one camera mounted at a position within the workspace to provide trafficway monitoring within at least selected areas of the workspace;

providing at least one sensors/readers of transponder output at positions within the workspace to provide trafficway detection within at least some areas of the workspace; and collecting transponder, camera and sensor information and analyze for any UNAUTHORIZED/ALARM-CONDITION entry into, or any UNAUTHORIZED/ALARM-CONDITION approach to, a designated area by using any of motion, face recognition, heat transfer or other detection methods, and activating a responsive action in consequence thereof.

15. The method of claim 14, wherein:

the responsive action is any of an audible alarm, a visual cue, remote-activated shut down of the motor vehicle and/or remote-activated de-powering of any power-drawing other hazard.

16. The method of claim 14, further comprising the step(s) of:

monitoring traffic flow and potential hazards and signaling variably programmable warnings to approaching traffic using the classified Transponder identity that is approaching from an opposing traffic way.

17. The method of claim 14, further comprising the step(s) of:

inter-connecting multiple sensors and signaling devices across multiple paths to provide identification, safety, range and or location performance; wherein said inter-connectivity can also adjust the location area in a precise way for normal or irregular shaped areas being protected or authorized for certain people or equipment.

18. The method of claim 14, further comprising the step(s) of:

detecting moving and stationary entities in an area within the workspace; and predicting by computer-aided analysis of the relative movement of the entities within the area based on each entity's specific movement capability, history of traffic patterns and, if applicable, current driver record;

whereby in consequence thereof activating a responsive action.

19. The method of claim 18, wherein the step of detecting moving and stationary entities in the area further comprises the step(s) of:

detecting entities including entities classified in traffic control system as well as entities not classified in the traffic control system by non-transponder detection options.

20. The method of claim 14, wherein the responsive action further comprises any of:

system activated, system controlled and system defined alerts or signals that may be differentiated by identity of entity detected for any combination of entity characteristics including:

- entity type (pedestrian, vehicle type, remote controlled or driver driven or other hazard);
- entity movement capabilities including speed, direction, turning radius, stopping distance (based on entity factory specifications and or historical data collected on entity or entity type);
- entity location;
- system defined requirements for entity or entity type for detected location of entity;
- entity or entity type authorization to area;
- detected direction or speed of movement of detected entity including moving forward, backward, turning, or stopping;
- entity or entity type rated load capacity; or
- entity actual load capacity.

* * * * *